United States Patent
Schwindt

(10) Patent No.: US 11,765,091 B2
(45) Date of Patent: Sep. 19, 2023

(54) CONFIGURABLE NETWORK SWITCH FOR INDUSTRIAL CONTROL SYSTEMS INCLUDING DETERMINISTIC NETWORKS

(71) Applicant: GE AVIATION SYSTEMS LIMITED, Cheltenham (GB)

(72) Inventor: Stefan Alexander Schwindt, Cheltenham (GB)

(73) Assignee: GE AVIATION SYSTEMS LIMITED, Cheltenham (DE)

( * ) Notice: Subject to any disclaimer, the term of this patent is extended or adjusted under 35 U.S.C. 154(b) by 0 days.

(21) Appl. No.: 17/863,777

(22) Filed: Jul. 13, 2022

(65) Prior Publication Data
US 2022/0353192 A1 Nov. 3, 2022

Related U.S. Application Data

(62) Division of application No. 16/240,469, filed on Jan. 4, 2019, now Pat. No. 11,411,874.

(30) Foreign Application Priority Data

Jan. 29, 2018 (GB) ...................................... 1801417

(51) Int. Cl.
*H04L 47/2441* (2022.01)
*H04L 43/18* (2022.01)
(Continued)

(52) U.S. Cl.
CPC ........ *H04L 47/2441* (2013.01); *H04L 41/142* (2013.01); *H04L 43/04* (2013.01);
(Continued)

(58) Field of Classification Search
None
See application file for complete search history.

(56) References Cited

U.S. PATENT DOCUMENTS 8,589,521 B2  11/2013  Ling
8,949,668 B2  2/2015  Hanks
(Continued)

FOREIGN PATENT DOCUMENTS

CN  104410581 A  3/2015
CN  106998326 A  8/2017
(Continued)

OTHER PUBLICATIONS

Hermann Kopetz, Astrit Ademaj, Petr Grillinger and Klaus Steinhammer, The Time-Triggered Ethernet (TTE) Design, pp. 1-12, (Year: 2015).*

(Continued)

*Primary Examiner* — Christopher M Crutchfield
(74) *Attorney, Agent, or Firm* — Fitch, Even, Tabin & Flannery LLP

(57) ABSTRACT

A network switch includes a first port configured for communication with a first electric device and a second port configured for communication with a second electric device in a deterministic network. The network switch includes one or more processors configured to receive at the first port a communication packet associated with the first electric device and the second electric device, determine if the communication packet satisfies a plurality of protocol constraints, and in response to the communication packet satisfying the plurality of protocol constraints, input one or more message characteristics from the communication packet into a model associated with a first industrial process. The model is configured to output a process behavioral classification based on the one or more message characteristics. The one or more processors receive a process behavioral classification for the communication packet, and selectively generate a control action for the ICS based on the process behavioral classification.

19 Claims, 12 Drawing Sheets

(51) Int. Cl.
| | |
|---|---|
| H04L 41/142 | (2022.01) |
| H04L 9/40 | (2022.01) |
| H04L 43/04 | (2022.01) |
| H04L 67/12 | (2022.01) |
| H04L 45/00 | (2022.01) |
| H04L 47/10 | (2022.01) |
| H04L 69/22 | (2022.01) |
| H04L 41/06 | (2022.01) |
| H04L 43/16 | (2022.01) |

(52) U.S. Cl.
CPC ............ *H04L 43/18* (2013.01); *H04L 45/70* (2013.01); *H04L 47/23* (2013.01); *H04L 63/1408* (2013.01); *H04L 63/1425* (2013.01); *H04L 67/12* (2013.01); *H04L 69/22* (2013.01); *H04L 41/06* (2013.01); *H04L 43/16* (2013.01); *H04L 63/1416* (2013.01)

(56) References Cited

U.S. PATENT DOCUMENTS

| | | | |
|---|---|---|---|
| 9,369,434 | B2 | 6/2016 | Kim |
| 9,405,900 | B2 | 8/2016 | Dixit |
| 9,699,204 | B2 * | 7/2017 | Kim ...................... H04L 69/329 |
| 9,699,294 | B1 | 7/2017 | Yao |
| 9,774,496 | B2 | 9/2017 | Ma |
| 10,015,188 | B2 | 7/2018 | Schneider |
| 11,411,874 | B2 * | 8/2022 | Schwindt ................ H04L 43/18 |
| 2008/0082304 | A1 | 4/2008 | Miller |
| 2010/0165878 | A1 * | 7/2010 | Soni ........................ H04L 67/12 370/254 |
| 2010/0322249 | A1 * | 12/2010 | Thathapudi ............. H04L 47/36 370/395.1 |
| 2013/0031037 | A1 | 1/2013 | Brandt |
| 2014/0380001 | A1 | 12/2014 | Schubert |
| 2015/0067764 | A1 | 3/2015 | Kim |
| 2016/0381066 | A1 | 12/2016 | Galula |
| 2017/0063891 | A1 | 3/2017 | Muddu |
| 2017/0201537 | A1 | 7/2017 | Caldwell |
| 2018/0198803 | A1 | 7/2018 | Pfleger De Aguiar |
| 2018/0255082 | A1 | 9/2018 | Ostergaard |
| 2018/0295147 | A1 | 10/2018 | Haga |
| 2019/0149480 | A1 | 5/2019 | Singhvi et al. |
| 2019/0238470 | A1 | 8/2019 | Schwindt |
| 2019/0253339 | A1 * | 8/2019 | Mehmedagic ........ H04L 45/123 |

FOREIGN PATENT DOCUMENTS

| | | |
|---|---|---|
| EP | 2779569 A1 | 9/2014 |
| EP | 3024192 A1 | 5/2016 |
| EP | 3133793 | 2/2017 |
| EP | 3133793 A1 | 2/2017 |
| FR | 3127024 | 3/2023 |
| FR | 3127025 | 3/2023 |
| FR | 3127269 | 3/2023 |
| GB | 2491237 A | 11/2012 |
| JP | 2017111796 A | 6/2017 |

OTHER PUBLICATIONS

A. Valdes Or S. Cheung, Communication pattern anomaly detection in process control systems, pp. 22-29 (Year: 2009).
Aguinaldo B. Batista Jr., Tiago H. Kobayashi, Joao Paulo S. Medeiros, Agostinho M. Brito Jr., and Paulo S. Motta Pires, Application Filters for TCP/IP Industrial Automation Protocols, pp. 1-224 (Year: 2009).
Anastasis Keliris, Hossein Salehghaffari, Brian Cairl, Prashanth Krishnamurthy, Michail Maniatakosy and Farshad Khorrami, Machine Learning-based Defense Against Process-Aware Attacks on Industrial Control Systems, pp. 1-10 (Year: 2016).
European Search Report Corresponding to Application No. 19153814 dated Apr. 26, 2019.
Great Britain Office Action Corresponding to Application No. 1801417 dated May 20, 2020.
F. Schuster, A. Paul, H. Konig, Towards Learning Normality for Anomaly Detection in Industrial Control Networks, pp. 1-13 (Year: 2013).
Fabio Pasqualetti, Florian Dorfler, and Francesco Bullo, Attack Detection and Identification in Cyber-Physical Systems, pp. 1-15 (Year: 2013).
Farshad Khorrami, Prashanth Krishnamurthy, and Ramesh Karri, Cybersecurity for Control Systems: A Process-Aware Perspective, pp. 1-9 (Year: 2016).
Inaki Garitano, Roberto Uribeetxeberria and Urko Zurutuz, A Review of SCADA Anomaly Detection Systems, pp. 1-10 (Year: 2011).
J. Angseus, R. Ekbom, Network-based Intrusion Detection Systems for Industrial Control Systems, pp. 1-103 (Year: 2017).
W. Gao, T. Morris, On Cyber Attacks and Signature Based Intrusion Detection for Modbus Based Industrial Control Systems, pp. 1-21 (Year: 2014).
W. Shang, J, Cui, M. Wan, P. An, P. Zeng, Modbus Communication Behavior Modeling and SVM Intrusion Detection Method, pp. 1-6 (Year: 2016).
Wenli Shang, Quansheng Qiao, Ming Wan, Peng Zeng, Design and Implementation of Industrial Firewall for Modbus/TCP, pp. 1-7 (Year: 2015).
Yan Hu, An Yang, Hong Li, Yuyan Sun, and Limin Sun, A survey of intrusion detection on industrial control systems, pp. 1-14 (Year: 2018).
J. Beaver et al., An Evaluation of Machine Learning Methods to Detect Malicious SCADA Communications, 2013 13th International Conference on Machine Learning and Applications; p. 54-59.
French Application No. FR2109526, Filed Sep. 10, 2021, Title: Flexibilities in a geared gas turbine engine, (Ref. B-024242).
French Application No. FR2109530, Filed Sep. 10, 2021, Title: Flexibilities in a geared gas turbine engine, (Ref. B-024243).
French Application No. FR2109787, Filed Sep. 17, 2021, Title: Aircraft Turbine Engine With an Off-Axis Propeller, (Ref. B-024794).
French Application No. FR2112509, Filed Nov. 25, 2021, Title: Device for Pressurizing a Turbomachine Enclosure With Acurvic Coupling Passage, and Corresponding Turbomachine, (Ref. B-0250350).
French Application No. FR2112280, Filed Nov. 19, 2021, Title: Assembly With Variable Setting for a Fan of a Turbomachine, (Ref. B-024468).
French Application No. FR2202172, Filed Mar. 11, 2022, Title: Aeronautical Thruster, (Ref. B-025596).
French Application No. FR2202171, Filed Mar. 11, 2022, Title: Propulsion System for an Aircraft, (Ref. B-025595).
French Application No. FR2201260, Filed Feb. 14, 2022, Title: Propulsion unit for aircraft comprising a gas turbine engine and an electrical machine mounted in an enclosure with a cooling system comprising a main coupling member, method for using such a unit, (Ref. B-025173).
French Application No. FR2201266, Filed Feb. 14, 2022, Title: Gas turbine engine assembly comprising a housing with half-shells bearing variable pitch inlet stator vanes, (Ref. B-024190).
French Application No. FR2200883, Filed Feb. 1, 2022, Title: Method for managing the torque of a turbomachine, (Ref. B-025105).
French Application No. FR2114236, Filed Dec. 22, 2021, Title: Turbine Engine Subassembly Including a Gooseneck With an Improved Configuration and Turbine Engine Including a Subassembly of This Type (Ref. B-024601).
French Application No. FR2114272, Filed Dec. 22, 2021, Title: Aircraft Turbine Engine Comprising Blade Pitch Control Using Local Pressure Measurements, (Ref. B-024494).
French Application No. FR2113949, Filed Dec. 20, 2021, Title: Turbomachine Module Equipped With a Pitch Change System and a Fluid Transfer Device, (Ref. B-024662).
French Application No. FR2113966, Filed Dec. 20, 2021, Title: Fluid Transfer Device With Hydraulic and Mechanical Connection Means, (Ref. B-024661).
French Application No. FR2113953, Filed Dec. 20, 2021, Title: Turbomachine Module Equipped With a Pitch Change System and a Fluid Transfer Device With Blind Sleeving, (Ref. B-024657).

(56) References Cited

OTHER PUBLICATIONS

French Application No. FR2113952, Filed Dec. 20, 2021, Title: Turbomachine Module Equipped With Variable Pitch Vanes and Oil Transfer Device, (Ref. B-023793).
French Application No. FR2113951, Filed Dec. 20, 2021, Title: Turbomachine Module Equipped With Variable Pitch Vanes and an Annular Interface Shroud, (Ref. B-023792).
French Application No. FR2113845, Filed Dec. 17, 2021, Title: Aircraft Turbomachine, (Ref. B-025396).
French Application No. FR2113847, Filed Dec. 17, 2021, Title: Aircraft Turbomachine, (Ref. B-025189).
French Application No. FR2113552, Filed Dec. 15, 2021, Title: Method for managing the torque of a turbomachine, (Ref. B-025059).
French Application No. FR2113361, Filed Dec. 13, 2021, Title: Turbomachine for an Aircraft Comprising an Electric Machine, (Ref. B-025039).
French Application No. FR2113100, Filed Dec. 7, 2021, Title: Cooling-air distribution case, (Ref. B-024474).
French Application No. FR2112869, Filed Dec. 2, 2021, Title: Turbine engine comprising an electric machine downstream from a turbine shaft and driven by this shaft, (Ref. B-025037).
French Application No. FR2112705, Filed Nov. 30, 2021, Title: Turbomachine Comprising a Lubrication Enclosure and a Speed Reducer, (Ref. B-024542).
French Application No. FR2112486, Filed Nov. 25, 2021, Title: Electric Energy Conversion and Transport System for the Internal Hybridization of an Aircraft Turbo-Engine, (Ref. B-025286).
French Application No. FR2112278, Filed Nov. 19, 2021, Title: Module for Assembling a Fan Blade of a Turbomachine, (Ref. B-024469).

* cited by examiner

CONFIGURABLE NETWORK SWITCH FOR INDUSTRIAL CONTROL SYSTEMS INCLUDING DETERMINISTIC NETWORKS

CROSS-REFERENCE RELATED APPLICATION

This application is a division of U.S. application Ser. No. 16/240,469, filed on Jan. 4, 2019, which is hereby incorporated by reference in its entirety.

FIELD

The present disclosure relates generally to computer networks, and more particularly to network switches for deterministic networks.

BACKGROUND

Deterministic networks attempt to control when a communication packet arrives at its destination (e.g., within a bounded timeframe). Additionally, deterministic networks include predefined or preprogrammed routes between nodes of the network. This category of networking may be used for a myriad of applications such as industrial automation, vehicle control systems, and other systems that require the precise delivery of control commands to a controlled device. In particular, a protocol can define communications between electric and electronic devices connected to a communication network used in aviation, automotive and industrial control applications.

BRIEF DESCRIPTION

Aspects and advantages of the disclosed technology will be set forth in part in the following description, or may be obvious from the description, or may be learned through practice of the disclosure.

According to example embodiments of the disclosed technology there is provided a network switch for an industrial control system (ICS). The network switch comprises a first port configured for communication with a first electric device in a deterministic network, a second port configured for communication with a second electric device in the deterministic network, and one or more processors in communication with the first port and the second port. The one or more processors are configured to perform operations, comprise receiving at the first port a communication packet associated with the first electric device and the second electric device, determining if the communication packet satisfies a plurality of protocol constraints, and in response to the communication packet satisfying the plurality of protocol constraints, inputting one or more message characteristics from the communication packet into one or more models associated with one or more industrial processes. The one or more models are configured to output a process behavioral classification based at least in part on the one or more message characteristics. The operations further comprise receiving, as output of the one or more models in response to the one or more message characteristics, a process behavioral classification for the communication packet, and selectively generating a control action for the ICS based at least in part on the process behavioral classification.

According to example embodiments of the disclosed technology, there is provided a computer-implemented method that comprises receiving, at a first port of a network switch, a communication packet from a first electric device of an industrial control system (ICS) comprising a deterministic network, determining, by the network switch, whether the communication packet satisfies a plurality of protocol constraints associated with the deterministic network, in response to the communication packet satisfying the plurality of protocol constraints, determining a process behavioral classification for the communication packet based at least in part on one or more message characteristics of the communication packet and a model associated with a first industrial process, and selectively generating, by the network switch, a control action for the ICS based on the process behavioral classification.

According to example embodiments of the disclosed technology, there is provided An industrial control system (ICS), comprising a communication network, a first electric device coupled to the communication network, a second electric device coupled to the communication network, and a network switch having a first port coupled to the first electric device over the communication network and a second port coupled to the second electric device over the communication network. The network switch is configured to receive via the first port a data packet having a source address and a destination address, determine whether the source address corresponds to the first electric device and whether the destination address corresponds to the second electric device, in response to determining that the source address and destination address correspond to the first electric device and the second electric device, respectively, compare an actual value of a characteristic of the data packet with a reference value for the characteristic, and transmit via the second port the data packet to the destination address if the actual value corresponds to the reference value.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
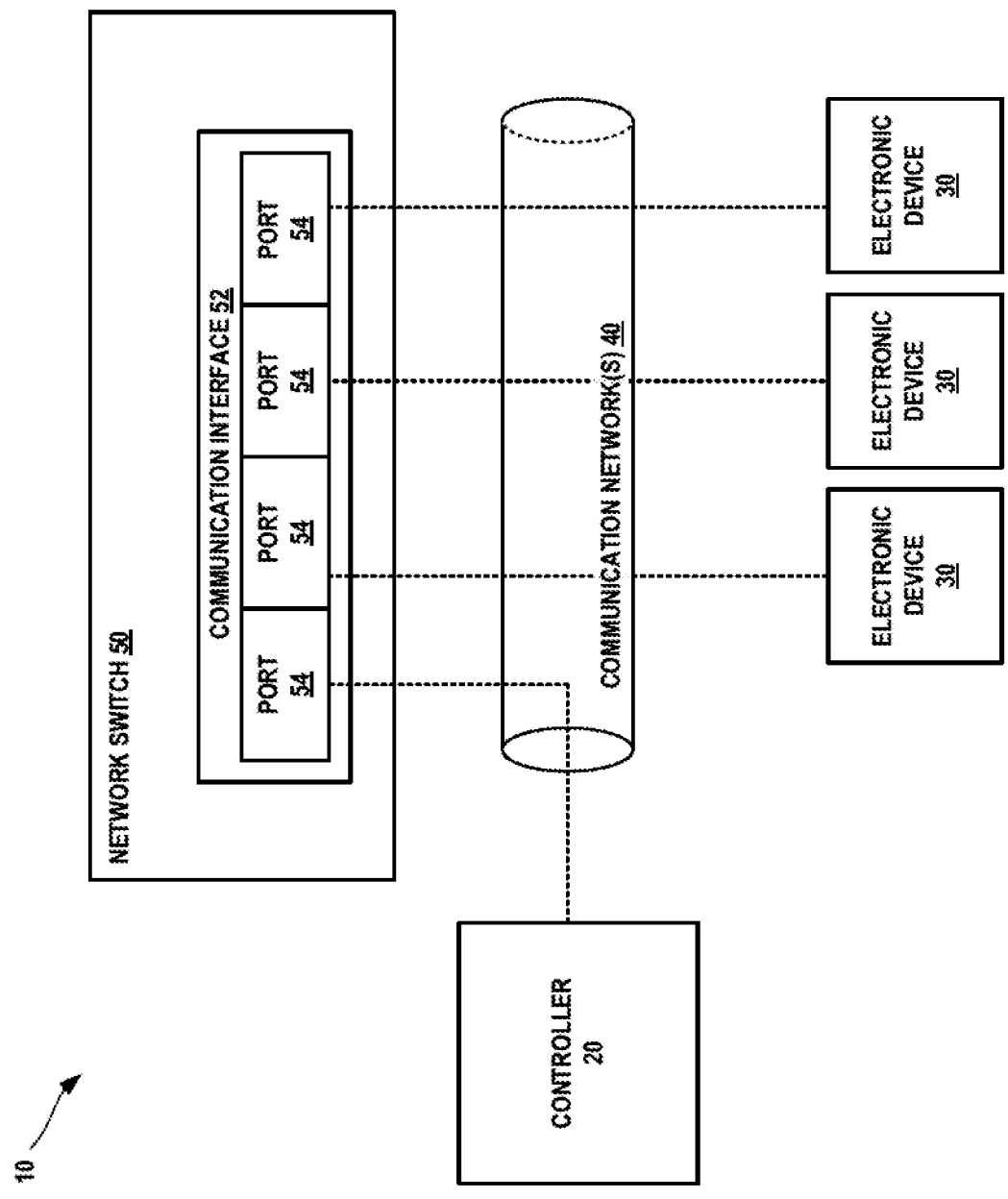
FIG. 1 depicts a block diagram of an example deterministic network in which embodiments of the present disclosure may be practiced.

Reference now will be made in detail to embodiments of the disclosure, one or more examples of which are illustrated in the drawings. Each example is provided by way of explanation, not limitation of the disclosed embodiments. In fact, it will be apparent to those skilled in the art that various modifications and variations can be made in the present disclosure without departing from the scope or spirit of the claims. For instance, features illustrated or described as part of example embodiments can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed systems and methods for industrial control systems, and more particularly, to systems and methods for securing communications in industrial control systems including one or more deterministic networks. According to example embodiments, a network switch is provided for an industrial control system. The network switch is configured to intelligently route communication packets between electric and electronic devices that communicate using the one or more deterministic networks. In some implementations, the network switch is configured to enforce one or more protocol constraints on communication packets. The one or more protocol constraints may specify message characteristics to be satisfied by the communication packet in order to be routed to a destination address associated with the communication packet. In some implementations, the network switch is configured to additionally or alternatively use one or more models associated with an industrial process to route communication packets. For example, the network switch may input one or more message characteristics associated with a communication packet into one or more models and receive a process behavioral classification in response. The network switch may then selectively generate a control action based on the process behavioral classification.

According to example embodiments, the network switch may include one or more computing devices having a communication interface coupled to one or more networks of an industrial control system. The communication interface may include a plurality of ports, with each port associated with one or more electric devices, including electronic devices, of the industrial control system. In example embodiments, one of the electric devices is an electronic controller configured to control the industrial control system by transmitting control signals to the electronic devices. More particularly, the controller may transmit command packets through the network switch, including commands such as control parameters for the other electric devices. By way of example, the controller may provide control parameters including flow rates, actuation commands, and any other desirable industrial control command for an electric device in the network. Similarly, the controller may receive communication packets such as data packets having sensor parameters from the electric devices. The controller may receive the data packets from the network switch and use the sensor parameters to determine control commands for the industrial control system.

According to example embodiments, the network switch is configured to route communication packets including data packets and command packets, based on one or more protocol constraints and/or one or more models. For example, the network switch may include a protocol analyzer configured to receive a communication packet. The protocol analyzer may obtain one or more protocol constraints in order to determine whether the communication packet should be further transmitted by this network switch. The one or more protocol constraints may be specific to a particular communication packet, such as by being selected according to a communication packet type, device, location, process, or may be generalized protocol constraints that apply to all communication packets on the network. The protocol analyzer may obtain one or more message characteristics associated with the communication packet. The one or more message characteristics can be compared with the one or more protocol constraints.

If the protocol analyzer determines that the message characteristics do not satisfy the protocol constraints, the communication packet may be rejected, such as by dropping the communication packet. In some examples, an additional control action is generated in response to a communication packet failing to satisfy one or more protocol constraints. In various examples, the control action may include an operator alert and/or a command to one or more electric devices to enter a safe operating mode.

If the one or more message characteristics satisfy the one or more protocol constraints, the communication packet may be passed to a process classifier. The communication packet or the message characteristics of the communication packet can be passed to a process classifier in the network switch. The process classifier may obtain one or more models that are used to generate a process behavioral classification for the communication packet. In some implementations, the process classifier may input the communication packet or one or more of the message characteristics associated with the communication packet into the one or more models. The one or more models are configured to generate process behavioral classification based on the communication packet or message characteristics. In some examples, physics-based models may be used. In other examples, machine learned models may be used. A machine-learned model may be trained to generate process behavioral classifications based on communication packet routing. For example, training data may be developed by routing communication packets and observing responses of the industrial control system based on one or more sensors. In some implementations, the models can provide further security enhancements against attacks that employ acceptable data conforming to the protocol constraints. The models can be provided for observation and monitoring of data trends and ratios between inputs/outputs. Additionally, models can be configurable for parameters that could indicate particular adverse conditions. A model based on observation and monitoring, for example, can identify trends that may indicate a cavitation in a pump or a similar deleterious effect on the industrial control system.

The protocol analyzer may be configured to selectively generate a control action based on the process behavioral classification. For example, if a communication packet meets one or more threshold criterion, such as meeting a minimum classification level, the process classifier may pass the communication packet without generating a control action. If, however, the communication packet does not meet the threshold criterion, the process classifier may generate a control action. For example, the process classifier may provide an indication of the process classification to a control action generator. The control action generator in response to a malicious communication packet may generate an alert for an operator. In another example, the control action generator may respond to a malicious control packet by generating a command to one or more electric devices instructing the devices to enter a safe operating mode. Various classifications may be used in accordance with embodiments of the disclosed technology.

In some examples, the communication packet is selectively routed to its destination address based on the process behavioral classification. For example, if the process classifier determines that the communication packet satisfies one or more threshold criteria (e.g., a minimum classification level), the process classifier may pass the communication packet to a port for routing the packet to the appropriate destination address. If, however, the process classifier determines the communication packet does not satisfy the one or more threshold criteria (e.g., a malicious classification), it may drop the communication packet. In other examples in response to a malicious communication packet, the process classifier may route the communication packet to it destination address but may also generate a control action such as an alert or a command for the industrial control system to enter a safe operating mode.

In some implementations, segregation of safety levels can be provided in an ICS. For example, communications implemented in different safety integrity levels can be communicated over one common line, but can be segregated such that they do not interfere with each other.

Embodiments of the disclosed technology provide a number of technical benefits and advantages, particularly in the areas of industrial control systems and computing technology. For example, embodiments of the disclosed technology may improve industrial control systems by identifying communication packets that are invalid within a network of the industrial control system. Additionally, embodiments of the disclosed technology may identify valid communication packets that are associated with unknown, suspicious, and/or malicious behavior of the industrial control system. In this manner, potentially malicious communication packets may be identified and an appropriate control action taken in response. For example, embodiments of the disclosed technology enable communication packets to be dropped so that adverse consequences are not promulgated to electric devices within the industrial control system.

Additionally, models configured to generate process behavioral classifications for communication packets can identify potentially malicious activity associated with otherwise valid communication packets. For example, a model may be created that associates message characteristics of communication packets with predicted behaviors of the industrial control system. The models may be created by observing the industrial control system response to particular communication packets. In other examples, the models may be created using physics-based techniques. A communication packet, or message characteristics associated with communication packet, can be input to one or more models to receive a process behavioral classification. In this manner, the effect of a communication packet on the industrial control system can be predicted in advance of routing the communication packet. The network switch can intelligently route and/or generate a control action based on the predicted outcome of routing a communication packet. Such techniques provide for more efficient and safe operation of the industrial control systems. Security breaches, including intrusions into networks of the systems, can be identified such that communication packets are not routed in an effort to avoid the potential adverse consequences.

Embodiments of the disclosed technology provide more efficient and effective techniques for computing devices to identify potentially malicious communication packets. For example, protocol constraints are defined and compared with communication packets in order to identify invalid communication packets within the network. These communication packets can be rejected, such as by dropping them from the network routing. Additionally, communication packets are processed using one or more models may detect potentially malicious behavior associated with an otherwise valid communication packet. In this manner, a computing device may more effectively route communication network to ensure safe operation of the industrial control system.

FIG. 1 depicts a block diagram of an example industrial control system (ICS) 10 in which embodiments of the disclosed technology may be practiced. ICS 10 includes a network switch 50, controller 20, and a plurality of electronic devices 30 in communication over one or more industrial networks 40. ICS 10 may include various automated systems such as automated power generation systems and automated manufacturing systems. By way of example, automated power generation systems may include gas, water, steam, or wind turbines, combustion systems, electrical power generators, and other similar automated power generation systems. By way of example, automated manufacturing systems may include chemical process systems, refineries, and other manufacturing processes. It will be appreciated that embodiments of the disclosed technology may be used with any industrial control system. Electronic devices 30 are shown by way of example, but it will be appreciated that the disclosed technology may be applied with any electric device. For example, electric equipment may use analog or discrete connections that then translate to a databus. For instance, an analog signal may be read and a result sent via an Ethernet connection to a controller, or by commanding a relay via a discrete line due to a command over Ethernet. An example of an electronic device may include a traditional switch such as those found in typical computer networks where all ports are of the same data bus type (e.g., Ethernet). Another example of an electronic device may include a remote interface unit which translates between multiple data buses, as well as connects to non-data bus electric/electronic devices.

Controller 20 may include one or more computing devices configured to perform a variety of computer-implemented functions (e.g., performing methods, steps, calculations and the like disclosed herein) for controlling components of the industrial control system. For example, controller 20 may be configured to transfer communication packets over industrial networks 40 using network switch 50 in order to control electronic devices 30. The communication packets may include control packets transferring control parameters to electronic components such as valves, pumps, etc. and may include data packets transferring sensor or other measured system parameters.

Network switch 50 includes one or more computing devices having a communication interface 52. Communication interface 52 may include any suitable component for interfacing with one or more networks, including for example, transmitters, receivers, controllers, antennas, etc. A communications interface can include associated electronic circuitry that is used to send and receive data. More specifically, the communications interface can be used to send and receive data between any of the various components of the ICS 10. Similarly, a communications interface at any one of the components may be used to communicate with outside components such as another ICS or external network such as the internet. A communications interface may be any combination of suitable wired or wireless communications interfaces.

In FIG. 1, communication interface 52 includes a plurality of ports 54 configured to exchange communication packets with electronic devices 30 and controller 20 over one or more communication networks 40. Electronic devices 30 may include any suitable device including an electronic component. By way of example, electronic devices 30 may include pumps, valves, actuators, turbines, sensors, combustors, generators, metering equipment, transformers, switches, or any other suitable electronic device or device including electronic component. In some implementations, electronic devices 30 may include one or more computing devices configured to perform a variety of computer-implemented functions.

Communication network(s) 40 may include any number and type of suitable network for the exchange of information. By way of example, communication networks 40 may include one or more of a Local Area Network ("LAN"), a Metropolitan Area Network ("MAN"), a Wide Area Network ("WAN"), an ARINC 429, MIL-STD-1553, IEEE-1394, a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Communication network(s) 40 may include terrestrial and/or satellite-based networks. Note that any devices described herein may communicate via one or more such communication networks.

In some embodiments, communication network(s) are deterministic networks based on any suitable communication standard. A protocol may be defined that permits electronic devices on the communication network to communicate with particular electronic devices on the communication network, while precluding the electronic devices from communicating with other electronic devices on the communication network. In addition, the protocol may define the content of messages exchanged between the first electronic device and the second electronic device. In this way, the protocol can provide that communications on the network be deterministic.

By way of example, the communication network 40 can be based an industrial control network based on the Industrial Equipment Control 61158 protocol. It will be appreciated that the communication network 40 described above with reference to FIG. 1 is not limited to industrial control system applications. For example, a communication network similar to industrial control network 40 can be utilized in an aerial vehicle. For example, the communication network can be based on the ARINC 664 standard. In another example, one or more of the industrial networks 40 can be based on the MIL-STD 1553 standard. In yet another example, one or more of the industrial networks 40 can be based on the IEEE 802.3 standard. Alternatively, the control network(s) 40 can be used in automotive applications. More specifically, the communication network 40 can be based on the FlexRay protocol.

The network switch 50, controller 20, and/or electronic devices 30 may generally include one or more computing devices configured to perform a variety of computer-implemented functions, such as various methods, steps, calculations and the like disclosed herein. Generally, a computing device as described herein includes one or more processors and one or more memory devices. The term computing devices refers not only to integrated circuits referred to in the art as being included in a computer, but also refers to an application specific integrated circuit (A SIC), a field programmable gate array (FPGA), or any other programmable circuit. Network switch 50, electronic devices 30, and/or controller 20 may be implemented using any suitable hardware and/or software. Further details of an example computing system including one or more computing devices is described in FIG. 10.

The numbers, locations, and/or orientations of the components of example industrial control system 10 are for purposes of illustration and discussion and are not intended to be limiting. Those of ordinary skill in the art, using the disclosures provided herein, shall understand that the numbers, locations, and/or orientations of the components of the industrial control system 10 can be adjusted without deviating from the scope of the present disclosure.

Figure 2:
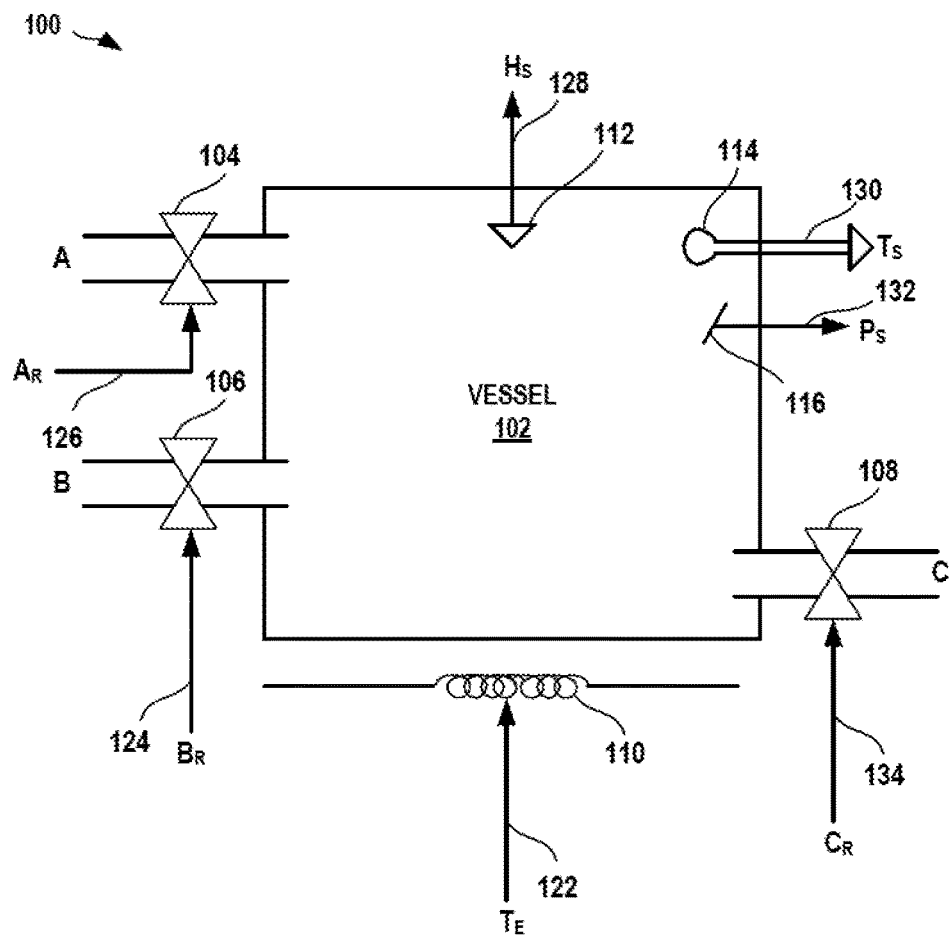
FIG. 2 depicts a block diagram of an example industrial control system for an example chemical process, including a deterministic network in which example embodiments of the present disclosure may be practiced.
Figure 2:
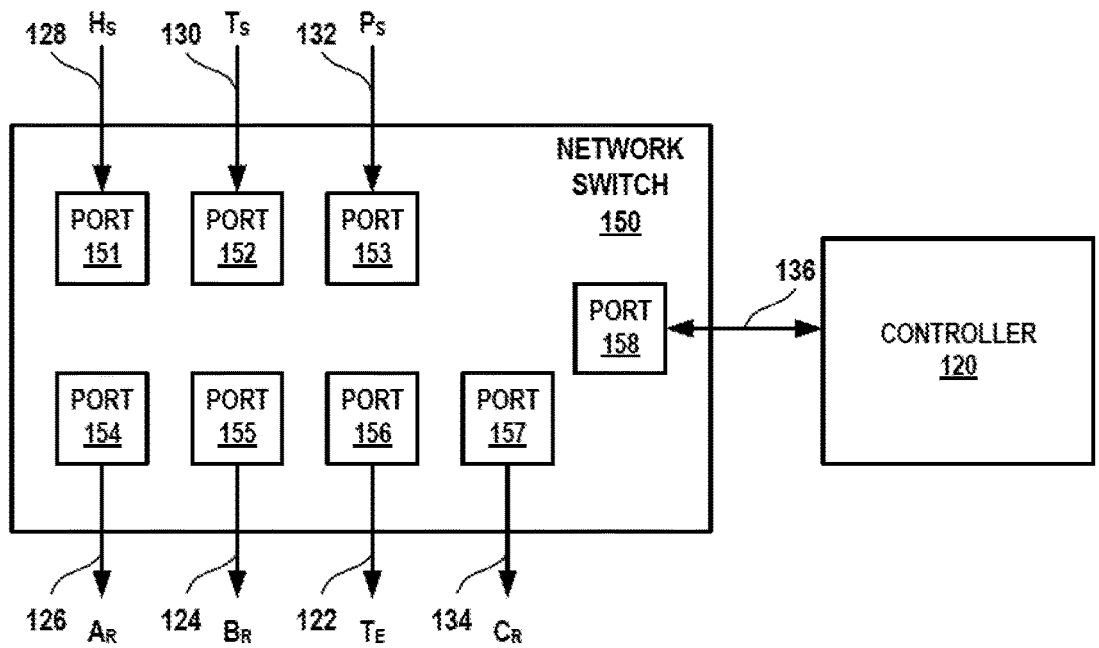

FIG. 2 is a block diagram of an industrial control system (ICS) 100, describing a specific example of a system that can be used to control a chemical process. Industrial control system 100 includes a vessel 102 or similar containment unit (e.g., reactor). Vessel 102 is configured for mixing components A and B to form a finished product C as part of a chemical process. ICS 100 includes electronic devices such as control valves 104, 106, 108, heating element 110, and sensors 112, 114, 116. Heating element 110 is provided to heat vessel 102 as part of the chemical process. Network switch 150 is configured to route communication packets between the various elements of the ICS 100. The sensors can be used to detect one or more parameters related to the ICS 100 and/or atmosphere external to the ICS. The sensors can communicate the one or more detected parameters to the controller 120 via network switch 150. In some implementations, the sensors 112, 114, 116, network switch 150, and/or controller 120 can communicate parameters to one or more external components.

Network switch 150 is shown in simplified form including a plurality of ports 151-158. Other components such as a computing device are not shown for simplicity. Each of the sensors 112, 114, 116 is an example of an electronic device such as electronic devices 30 depicted in FIG. 1. Similarly control valves 104, 106, 108 and heating element 110 are examples of electronic devices 30. It will be appreciated that various electronic components such as actuators and the like may be included within any of these elements, forming an electronic device.

Generally, the chemical process is monitored using the sensors to determine the temperature, pressure, and height of materials in vessel 102. A height sensor 112 generates a sensor signal 128 including a height parameter HS, representing a height of components in the vessel. Sensor signal 128 is received at port 151 of network switch 150. A temperature sensor 114 generates a sensor signal 130 including a temperature parameter TS representing a temperature of the vessel. Sensor signal 130 is received at port 152 of network switch 150. A pressure sensor 116 generates a sensor signal 132 including a pressure parameter PS representing a pressure within the vessel. Sensor signal 132 is received at port 153 of network switch 150. Height parameter HS, temperature parameter TS, and pressure parameter PS are examples of sensor parameters. Other examples of sensor parameters and other electronic device parameters may be used. In various examples, the control signals may carry data packets including the respective sensor parameters. For example, sensor signal 132 may transmit data packets including the pressure parameter PS representing pressure in the vessel.

The process is controlled by regulating the control valves 104, 106, and 108, and/or heating element 110 based on the sensor parameters. More specifically, network switch 150 is coupled over one or more deterministic networks (not shown) to each of the electronic devices, as well as to controller 120. Controller 120 monitors the chemical process based on data packets including the sensor parameters received from the sensors via network switch 150. Controller 120 controls the process by transmitting, via network switch 150, command packets including control parameters for the electronic devices.

Control valves 104 and 106 regulate the inflow rate of components A and B, respectively. Control valve 108 regulates an outflow rate of finished product C. Controller 120 determines the appropriate flow control parameter values and transmits one or more sensor signals 136, including command packets with the flow control parameter values AR, BR, CR, to network switch 150 using port 158. Control signal 126 transmits a command packet including flow control parameter AR via port 154. Control signal 124 transmits a command packet including flow control parameter BR via port 155. Control signal 134 transmits a command packet including flow control parameter CR. Similarly, control signal 122 transmits a command packet including temperature parameter TE. The various control parameters may specify the respective inflow/outflow rates and/or temperature directly in some implementations. In other implementations, the control parameter may specify another control, such as an actuation level for a valve, a rate of an engine, a voltage or current level, etc.

Figure 3:
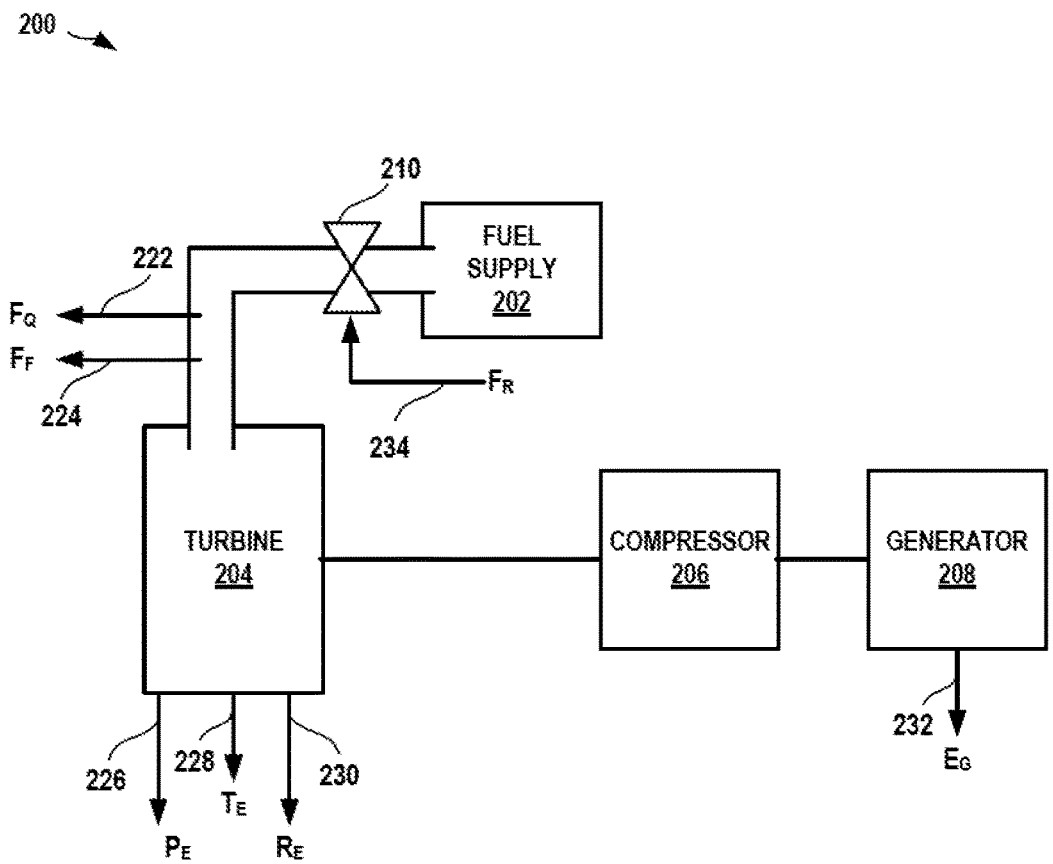
FIG. 3 depicts a block diagram of an example industrial control system for a power station, including a deterministic network in which example embodiments of the present disclosure may be practiced.
Figure 3:
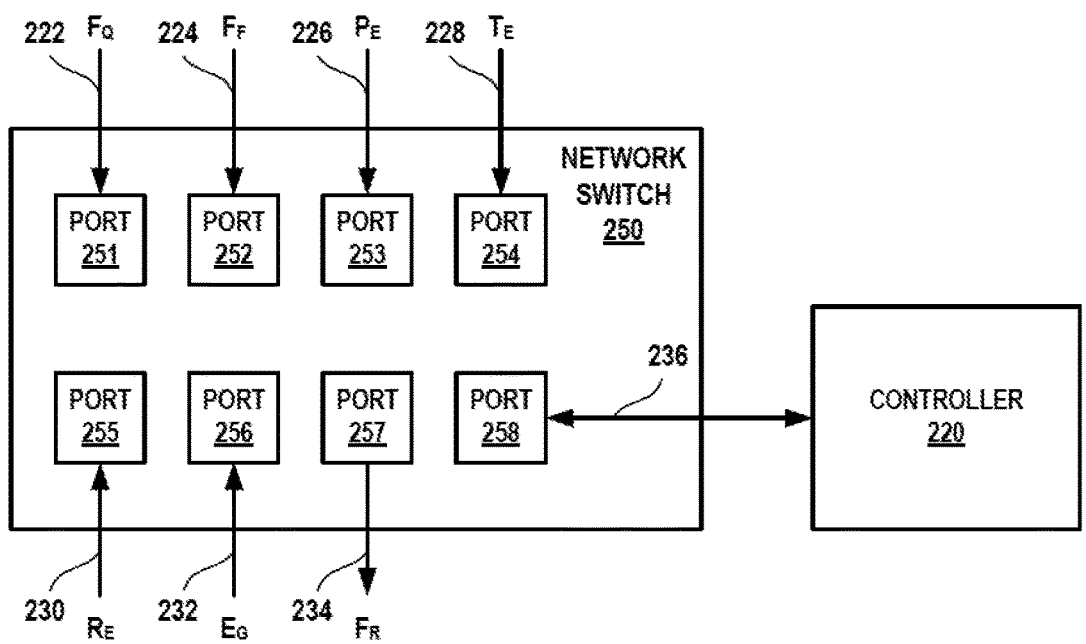

FIG. 3 is a block diagram of another industrial control system 200, describing a specific example of a system the can be used to implement a power station. Industrial control system 200 includes a fuel supply 202 configured to supply fuel to a turbine 204. A traditional power station system is shown including a compressor 206 in communication with turbine 204 and a generator 208.

A gas turbine engine can include a fan and a core arranged in flow communication with one another. Additionally, the core of the gas turbine engine generally includes, in serial flow order, a compressor 206 section, a combustion section (not shown), a turbine 204 section, and an exhaust section (not shown). In operation, air is provided from the fan to an inlet of the compressor section where one or more axial or centripetal compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. In a power station, the turbine can drive a generator 208 to generate power.

Industrial control system 200 includes a plurality of sensors (not shown) configured to generate control signals transmitting data packets having sensor parameters associated with the industrial control process. In this example, a first sensor generates a first control signal 222 for transmitting data packets including a sensor parameter FQ. Sensor parameter FQ represents a fuel quantity that has been transmitted from fuel supply 202 to turbine 204. A second sensor generates a second control signal 224 for transmitting data packets including a sensor parameter FF. Sensor parameter FF specifies a measured fuel flow rate between the fuel supply 202 and the turbine 204. A third sensor associated with turbine 204 is configured to generate a control signal 226 including data packets with a control parameter PE specifying an engine pressure. A fourth sensor associated with turbine 204 is configured to generate a control signal 228 transmitting data packets with a control parameter TE which specifies an engine temperature. A fifth sensor associated with turbine 204 is configured to generate a control signal 230 transmitting data packets with a sensor parameter specifying an engine RPM. A sixth sensor associated with generator 208 is configured to generate a control signal 232 transmitting data packets with a control parameter EG specifying a generator electrical measure. The generator electrical measure can include an amperage, voltage, and/or power measure in various examples.

Port 251 of network switch 250 is in communication with the first sensor to receive sensor signal 222 including control packets with control parameter FQ. Port 252 is in communication with the second sensor to receive sensor signal 224 including data packets with sensor parameter FF. Port 253 is in communication with the third sensor to receive sensor signal 226 including data packets with sensor parameter PE. Port 254 is in communication with the fourth sensor to receive sensor signal 228 including data packets with sensor parameter TE. Port 230 is in communication with the fifth sensor to receive sensor signal 230 including data packets with sensor parameter RE. Port 232 is in communication with the sixth sensor to receive sensor signal 232 including data packets with sensor parameter EG.

Control valve 210 regulates the outflow rate fuel from fuel supply 202 to turbine 204. Control signal 234 is provided from port 257 to control valve 210 in order to transmit command packets including control parameter FR. Control parameter FR specifies the flow rate of control valve 210. Controller 220 is in communication with port 258 of network switch 250 to send and receive control signals 236 including command packets and data packets. Network switch 250 receives the various sensor parameters in order to control the industrial control system including the power station. Controller 220 can receive various sensor parameters from switch 250 in order to determine how to run power station. Controller 220 can issue various command packets to control aspects of the industrial control system.

The command packets are provided to network switch 250 which routes the packets to the appropriate electronic device.

Controller 220 may determine the appropriate rotation speed of turbine 204 and/or compressor 206. Additionally controller 220 may determine the temperature and pressure at the various stages and the fuel flow and fuel quantity based on the sensor inputs. Controller 222 can monitor the output of generator 208. The controller then determines an appropriate fuel flow and possibly variable vanes based on the sensor data. The controller can generate one or more command packets. For example the controller can generate command packets for valve 210 in order to regulate the flow rate from fuel supply 202. The controller can transmit a control signal including a command packet having a control parameter FR specifying a target fuel flow rate.

Industrial control systems such as system 100 and system 200 may suffer from various types of security breaches that target the industrial control network and/or electronic devices coupled to the industrial control network. Intrusions into an industrial control system can cause detrimental behavior within the system. For example, an attacker may cause processes to be performed within the industrial control system that were not planned in order to disrupt and/or damage the industrial control system or one or more components thereof. Additionally, it is possible for an industrial control system to behave in an unintended manner that can lead to damage or inefficiencies in the system, without an associated security breach. For example, an operator or device within the system may issue an incorrect or invalid command causing disruption of the system. Similarly, a particular sequence and/or frequency of otherwise valid commands may cause disruption of the system.

Figure 4:
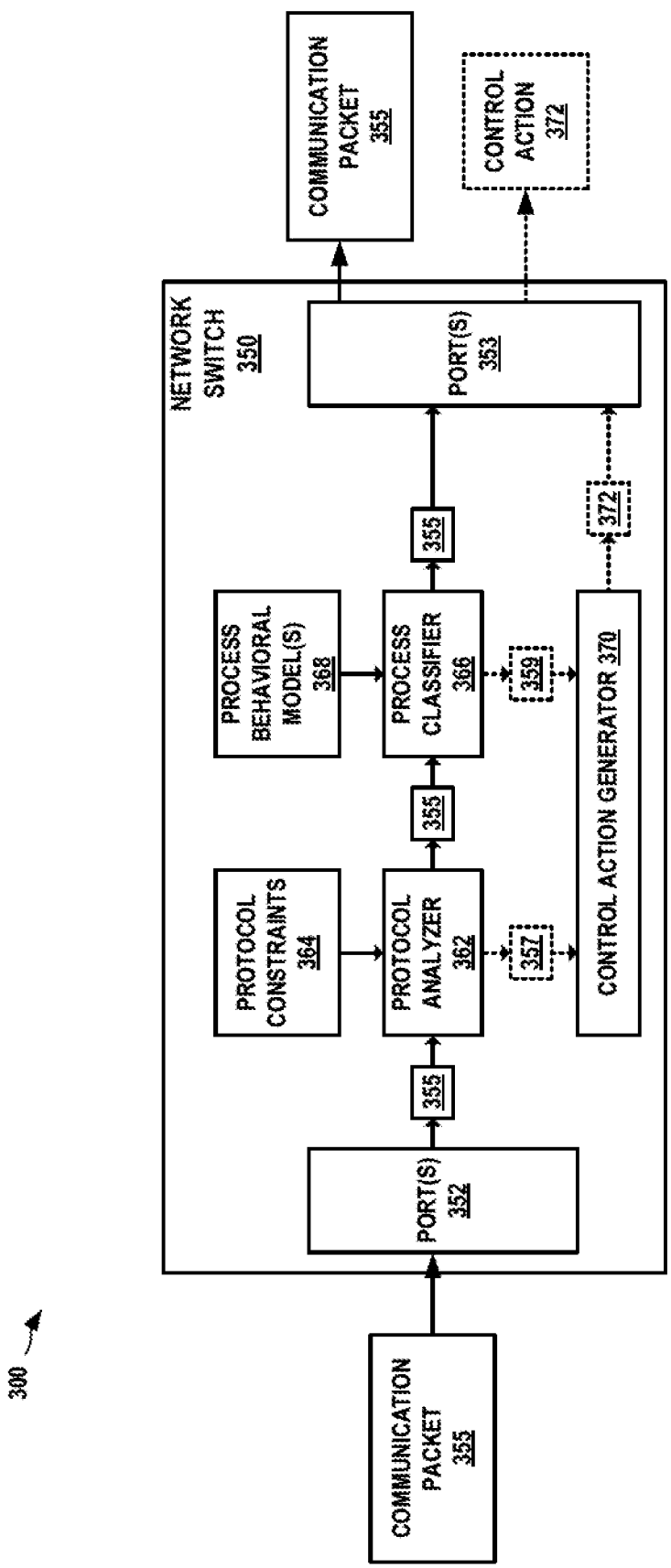
FIG. 4 depicts a block diagram of a portion of a deterministic network including an example network switch in accordance with example embodiments of the present disclosure.

FIG. 4 is a block diagram of an industrial control system 300 including a network switch 350 in accordance with example embodiments of the disclosed technology. Network switch 350 may include one or more computing devices configured to intelligently route communication packets in an industrial control system including a deterministic network. The one or more computing devices may include one or more processors (not shown) and one or more memory devices (not shown) as described herein. Network switch 350 includes a protocol analyzer 362 and process analyzer 366 configured to jointly route communication packets within the ICS 300 in a secure manner. Protocol analyzer 362 is configured to analyze communication packets received at the network switch 350 prior to routing the communication packets to one or more destination addresses. Protocol analyzer 362 is configured to analyze communication packets based on a comparison to one or more protocol constraints 364. Process analyzer 366 is configured to analyze communication packets based on a comparison to one or more process behavioral models 368.

Protocol constraints 364 can define a manner in which electronic devices on an industrial control network 40 can interact with one another. In some examples, the protocol constraints can define a reference value for one or more characteristics of communication packets that can be transmitted on the network 40. By way of example, protocol constraints may define reference values for characteristics such as a message format, a message frequency, a message payload, and a target device on the network 40. The message format may specify suitable message formats for the control network and/or for particular devices on the network. A reference value for the message frequency characteristic may specify how often a message can be transmitted on the network, such as to or from a particular device. A reference value for the message payload characteristic may specify a range of allowable values for data contained in a message. A reference value for the target device characteristic may specify a list of one or more devices on the network 40 that are permitted to receive a message.

Protocol constraints 364 are configurable in one example. In particular, protocol constraints may be added or removed from the network switch 350. Additionally, reference values for characteristics can be modified for already defined protocol constraints. For example, a reference value defining a range of allowable values for a data payload can be modified. As will be discussed below in more detail, a reference value for a characteristic included in a protocol constraint 364 can be used to audit communication packets (e.g., messages) on the communication network 40.

In some examples, the network switch can receive messages or communication packets comprising at least a source address and a destination address. The source address can be a unique identifier (e.g., network ID) of an electronic device sending the communication packet. The destination address can be a unique identifier of an electronic device that is in the intended recipient of the communication packet. The network switch can access data indicative of the unique identifier for each electronic device on the network. In this manner, the network switch can determine whether the source address of the communication packet belongs to one of the electronic devices on the network. Likewise, the network switch can determine whether the destination address of the communication packet belongs to one of the electronic devices on the network.

In addition, the network switch can access a protocol constraint defining communications on the network. In example embodiments, the protocol constraint can define a set of approved messages for the network. In addition, the protocol constraint can assign a reference value to one or more characteristics(s) of the approved messages. In one example embodiment, the characteristics(s) can include how frequently each approved message can be transmitted. In another example embodiment, the characteristics(s) can include a range of allowable values for data included in the payload of each approved message. In yet another example embodiment, the characteristic(s) can also include a listing of electronic devices that can receive each approved message. A set of protocol constraints may be referred to as a protocol. As will be discussed below in more detail, the protocol can be used to audit incoming messages (e.g., communication packets).

After the network switch determines the source address and the destination address of a communication packet correspond to two different electronic devices on the deterministic network, the network switch can use the protocol to further audit the communication packet. As an example, if the communication packet originates from a first electronic device and is intended for a second electronic device, the network switch can crosscheck the characteristic(s) to determine whether the second electronic device is permitted to receive the communication packet. If the network switch determines the second electronic device is not permitted to receive the communication packet, then the network switch will not transmit the communication packet to the second electronic device. Instead, the network switch will reject (e.g., drop) the communication packet.

If, however, the network switch determines the second electronic device can receive the communication packet, then the network switch can further audit the communication packet. In example embodiments, the network switch can inspect data stored in the payload of the communication packet. More specifically, the network switch can compare an actual value for characteristic(s) of the data against the reference value defined in the protocol constraint. As an example, if an actual length (e.g., number of bits) of the data is equal to 8 bits and the reference value for the length is 4 bits, then the network switch can reject (e.g., drop) the communication packet. As another example, if the actual data type of the data is a char (e.g., a letter) and the reference value for the data type is a float (e.g., number), then the network switch can reject (e.g., drop) the communication packet or, alternatively, quarantine the communication packet. In this way, the communication packet can be subject to forensic analysis.

In example embodiments, a portion of the data included in the payload of communication packet can be restricted. More specifically, the portion of the data can be classified differently than the remaining portion of the data. In example embodiments, the portion can be classified as secret data. In contrast, the remaining portion of the data can be classified as non-secret data. As will be discussed below in more detail, the network switch can be configured to determine whether the portion of the data classified as secret data must be redacted or obfuscated (that is, made unclear) prior to transmission of the communication packet to the second electronic device.

In example embodiments, the first electronic device and the second electronic device can be on different subnetworks of the deterministic network. More specifically, the first electronic device can be on a first subnetwork rated for data classified as both secret and non-secret. In contrast, the second electronic device can be on a second subnetwork rate for only non-secret data. As such, when the network switch receives a communication packet from the first electronic device that is intended for the second electronic device, the network switch can be configured to redact any portion of the data classified as secret data before transmitting the communication packet to the second electronic device. Alternatively, the network switch can obfuscate the portion of the data classified as secret before transmitting the communication packet to the second electronic device. For example, if the portion of the data classified as secret includes position data, the network switch can alter the position data. More specifically, the network switch can reduce the accuracy of the position data before transmitting the communication packet to the second electronic device. In this manner, the network switch can maintain confidentiality of data exchanged within the second subnetwork The process behavioral models 368 may be configured to receive one or more message characteristics associated with a communication packet and/or the communication packet itself, and to generate process behavioral classification for the communication packet. Various types of process behavioral models may be used. In one example, a physics-based model is used. The physics-based model may generate a process behavioral classification based on a predicted outcome or result of a control parameter included in a communication packet, for example. The physics-based model may include engineered outputs designed to classify a result of control parameter based on predefined or experimental results. In another example, a machine-learned model is used. The machine-learned model may generate a process behavioral classification using a model created from training data corresponding to a particular industrial process. For example, the machine-learned model may be generated by inputting message characteristics or communication packets and observing an outcome or results of the industrial process.

In some implementations, the process behavioral models 368 may generate classifications for sequences or other groups of data packets. For example, a model may generate a classification based on a plurality of message characteristics from the sequence of communication packets. Each packet in the sequence may receive the same behavioral classification in one example. The common behavioral classification may be based on the sequence of data packets rather than an individual data packet of the sequence.

The protocol constraints and/or the process behavioral models may be stored locally in a database accessible to the network switch 350, or may be received via a user interface, manually, and/or through the transmission of one or more signals. The protocol constraints and/or the process behavioral models may include information related to a particular device, port, or location. In some embodiments, the protocol constraints 364 and/or process behavioral models 368 may be maintained at one or more data stores comprising any combination of one or more of a hard disk drive, solid-state drive, RAM (random access memory), ROM (read only memory), flash memory, etc. The storage devices may store software that programs a processor of network switch 350 to perform functionality as described herein.

A data store can store the protocol constraints and/or process behavioral models in a format that can be accessed by one or more processors of the network switch 350. Protocol constraints 364 and/or process behavioral models 368 can include one or more table(s), function(s), algorithm(s), model(s), equation(s), etc. according to example embodiments of the present disclosure. A data store may include any suitable data storage technology such as databases, files, data structures and the like configured to store the associated information. In some embodiments, the network switch 350 may include a data store that may provide information to the protocol analyzer 362, process classifier 366, and/or control action generator 370, as well as store results from the any of these components.

A specific example is described with respect to FIG. 4, and more particularly to routing an example communication packet 355. Network switch 350 includes one or more first ports 352 configured to receive communication packet 355 over a communication network from a first electronic device. Communication packet 355 is routed from one of ports 352 to protocol analyzer 362. Protocol Analyzer 362 obtains one or more protocol constraints 364 from memory and compares the protocol constraints to the communication packet.

In some examples, protocol analyzer 362 may access a particular subset including one or more of protocol constraints 364. The subset of protocol constraints 364 may be selected based on a source and/or destination of the communication packet. In other examples, protocol analyzer 362 may apply the same protocol constraints to each communication packet.

If the communication packet fails to satisfy one or more protocol constraints, an indication 357 identifying the communication packet and/or the particular constraint failure is passed to control action generator 370. Based on the communication packet and/or the constraint failure, control action generator 370 generates a control action 372. Control action 372 is passed to port 353. The control action 372 may be passed to one or more electronic devices in the industrial control system. In response to failing to satisfy the one or more protocol constraints, communication packet 355 can be rejected. For example protocol analyzer 362 may drop communication packet 355 without transmitting the communication packet from the switch 350.

If protocol analyzer 362 determines that communication packet 355 satisfies the one or more protocol constraints, communication packet 355 is passed to process classifier 366 for additional analysis. Process classifier 366 analyzes one or more message characteristics associated with the communication packet based on one or more process behavioral models 368. By way of example, process classifier 366 may input the one or more message characteristics to a behavioral model and receive a process behavioral classification associated with the communication packet. In one example, the process behavioral model is a physics-based model. In another example, the process behavioral model is a machine-learned model. Process classifier 366 may determine a predicted outcome of the industrial control system based on the one or more message characteristics. For example, process classifier 366 may receive a process behavioral classification as an output of the model based on the one or more message characteristics. Any number and type of process behavioral classifications may be used. By way of example, process analyzer 366 may receive a classification of approved, suspicious, malicious, and or unknown.

Based on the process behavioral classification for a communication packet, network switch 350 selectively generates a control action. For example, network switch 350 may transmit or drop the communication packet based on the process behavioral classification, as well as decide whether to transmit a control action 372. By way of example, if a communication packet satisfies one or more threshold criterion, process analyzer 366 may pass communication packet 355 to port 353 without performing additional operations. In one example, the one or more threshold criterion may include a minimum classification level. The minimum classification level may correspond to a minimum classification in order to not generate a control action in one example. For instance, the minimum classification level can be a classification of safe in one example. Behavioral classifications that are not deemed safe do not meet the minimum classification level. In another example, the minimum classification level can be suspicious. Any type and variation of minimum classification level can be used according to a specific implementation.

If a communication packet fails to satisfy the one or more threshold criterion, such as by not meeting the minimum classification level, process analyzer 366 may generate an indication 359 for control action generator 370 to generate a control action 372. In response to malicious communication packet, for example, control action 372 may include a control parameter issued to one or more electronic devices instructing the electronic devices to enter a safe operating mode. Other examples of control action 372 may be generated in response to malicious communication packets or other communication packets that fail to meet a minimum classification level.

Process analyzer 366 may generate the indication 359 and not transmit communication packet 355 from the switch in one example, in response to a communication packet that fails to meet a minimum classification level. In another example, process classifier 366 may transmit the communication packet 355 even if it fails to meet the minimum classification level. In order to avoid false positives for example, an alert or other control action may be initiated while also transferring the communication packet.

Additional classifications can be used. If a communication packet is classified as suspicious, for example, process classifier 366 may transmit the communication packet to port 353, and additionally generate an indication 359 for a control action 372. For example, the control action may include transmitting a signal to generate an operator alert to the suspicious communication packet. In another example, the control action may include transmitting a signal to one or more electronic devices of the ICS, including a command to enter a safe operating mode. If a communication packet is classified as unknown, the process analyzer 366 may similarly pass communication packet 355 to port 353, while also generating an indication 359 for control action generator 372 to transmit a control action 372. It will be appreciated that the particular choice of when to perform a control action and what control action to perform may vary by implementation.

According to some embodiments, different safety levels can be provided and segregation of communications using the different safety levels can be used. For example, communications implemented in different safety integrity levels can be communicated over one common line, but can be segregated such that they do not interfere with each other.

It will be appreciated that the network switch 350 and components thereof can include or be associated with any suitable number of individual microprocessors, power supplies, storage devices, interface cards, and other standard components. The network switch can include or cooperate with any number of software programs or instructions designed to carry out the various methods, process tasks, calculations, and control/display functions necessary for operation of the network switch.

Various components of network switch 350 depicted in FIG. 4, such as protocol analyzer 362, process classifier 366, and/or control action generator 370, may be implemented as hardware, software, or as a combination of hardware and software. For example one or more of these components can be implemented individually or in combination with one or more other components as a packaged functional hardware unit (e.g., one or more electrical circuits) designed for use with other units, a portion of program code (e.g., software or firmware) executable by a processor that usually performs a particular function of related functions, or a self-contained hardware or software component that interfaces with a larger system, for example. Each controller, for example, may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, these components may include software stored in a processor readable device (e.g., memory) to program a processor network switch to perform the functions described herein.

Figure 10:
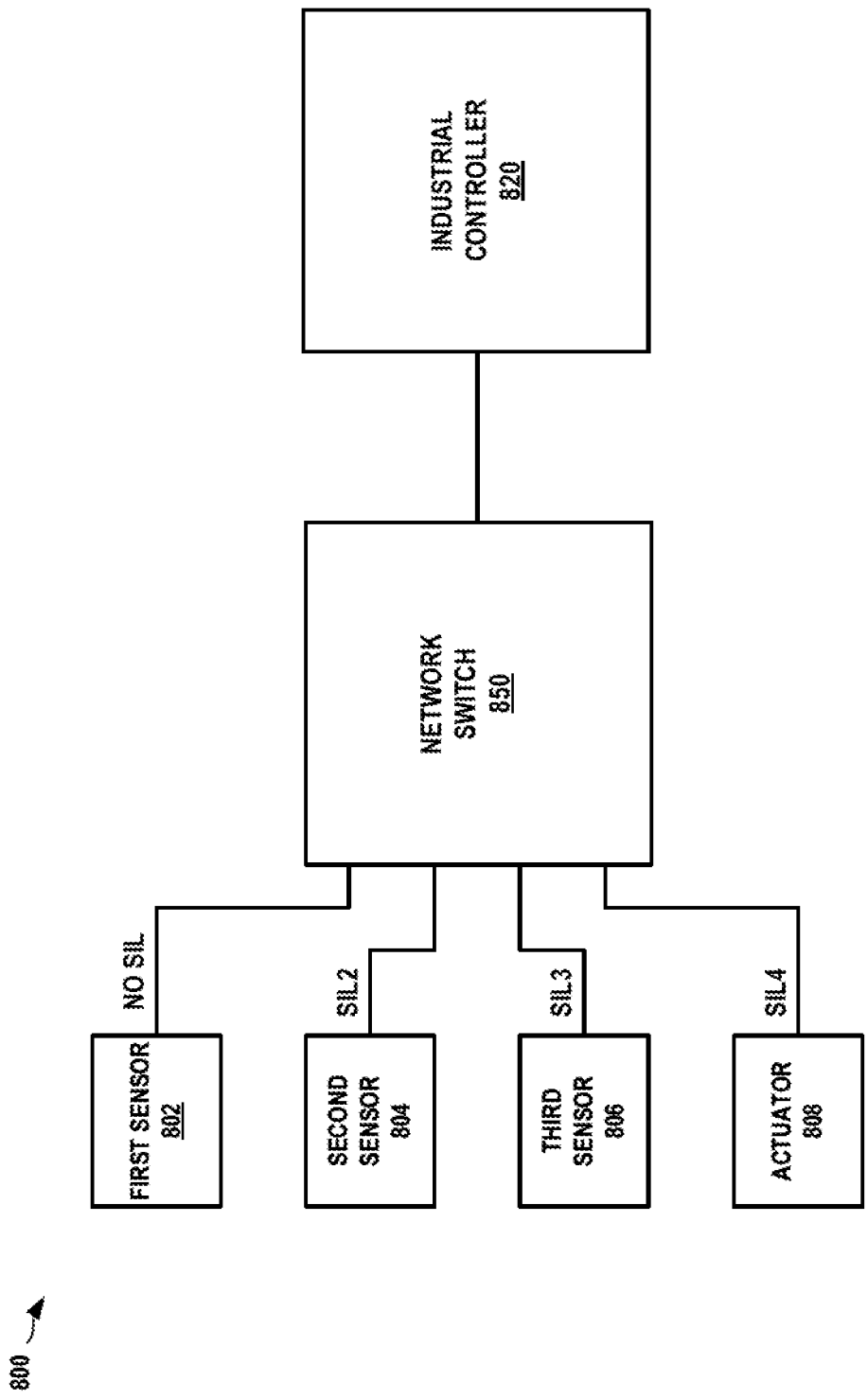
FIG. 10 depicts a block diagram of an example industrial control system in accordance with example embodiments of the present disclosure.

The architecture depicted in FIG. 4 is one example implementation. These various computing-based elements may be configured at a single computing device, or may be distributed across multiple computing devices. Each of the various components may be implemented with hardware, software, or a combination of both hardware and software as hereinafter described. The software may be stored as processor readable code and implemented in a processor, as processor readable code for programming a processor for example. FIG. 10 depicts an example of a computing device that can be used to implement various components of the described technology, including network switch 350.

Figure 5:
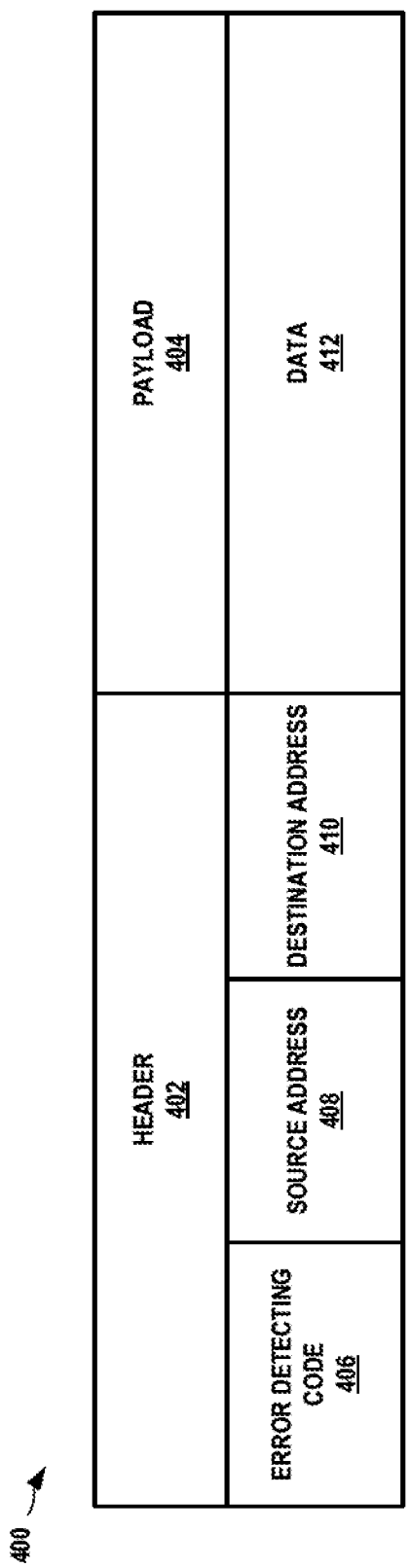
FIG. 5 is an example of a communication packet that can be used in accordance with embodiments of the present disclosure.

FIG. 5 is a block diagram depicting an example of a typical communication packet 400 that can be transmitted by a network switch in accordance with example embodiments of the disclosed technology. Communication packet 400 may be a data packet or a command packet in various examples. Communication packet 400 includes a header 402 and a payload 404.

Header 402 may include various fields that define the communication packet. In the example of FIG. 4, header 402 includes an error correcting code field 406, a source address field 408, and a destination address field 410. The error correcting code field 406 may include an entry specifying an air detecting code such as a cyclic redundancy check (CRC), a checksum value, a hash value, and the like, etc. the source address field 408 may include a source address such as a unique identifier (e.g., network ID) assigned to a particular location or device (for example electronic devices 30) on the network from which the packet originated. The destination address field for 410 may similarly include a unique identifier assigned to a particular location or device on the network to which the packet should be routed.

The payload 404 of the communication packet 400 can include data 412. In example embodiments, the data 412 can include sensor parameters, control parameters, and/or other control commands for the ICS. Data 412 may include one or more values for controlling an electronic device at the destination address. In some implementations, the one or more value(s) can be represented as hexadecimal numbers. It will be appreciated, however, that the value(s) can be represented in any suitable number format. Network switch 350 can be configured to audit communication packets 400. In this manner, the network switch 350 can improve security of the communication network 40.

Protocol analyzer can apply one or more of the protocol constraints 364 to validate incoming communication packets, such as communication packet 400, based on any one of the fields 406, 408, 410 in the header 402 or payload 404, including the content of any one of the fields and or the presence or absence of any one of the fields in the header or payload. Similarly, process classifier may pass any one of the fields as a message characteristic to a process behavioral model in order to receive a process behavioral classification.

In some implementations, communication packet 400 can include a media access control (MAC) address of the originating electronic device sending the communication packet. The MAC address can be another unique identifier assigned to each electronic device on the communication network 40 in this manner, the network switch 350 can be configured to validate the communication packet 400 based on both the network ID and the MAC address of the originating electronic device 40.

As an example, if a rogue device transmits a communication packet 400 having a network ID that matches the network ID assigned to the originating electronic device, the network switch 350 can compare the MAC address of the rogue device against the MAC address assigned to the originating device 30. If the MAC address of the rogue device does not match the MAC address assigned to the originating electronic device 30, then the network switch 350 can drop the communication packet 400. In this way, the MAC address can provide an additional measure the network switch 350 can use to safeguard the network 40 against rogue devices having a network ID that matches the network ID assigned to one of the electronic devices on the network 40.

In addition, the protocol constraints can include a list or table of the network ID and MAC address of each electronic device that is communicatively coupled to one of the plurality of communication ports of the network switch 350. The network ID and MAC address of each electronic device can be assigned to the port to which it is coupled. If a rogue device transmits a communication packet that has both a network ID and MAC address assigned to an originating electronic device, the network switch 350 can use the list to validate the communication packet based on the port on which the communication packet was received. If the rogue device transmitted the communication packet to a communication port that is not associated with the network ID and MAC address, then the network switch 350 can drop the communication packet. In this way, the list can provides an additional measure the network switch 310 can use to safeguard the network 40 against rogue devices having a network ID and MAC address that matches both the network ID and MAC address assigned to one of the electronic devices on the network 40.

Network switch 350 can store a table 353 that associates each unique identifier with a particular electronic devices 30 on the communication network 40. In this manner, the network switch 350 can determine the origin of a communication packet and a destination for the communication packet 40.

Figure 6:
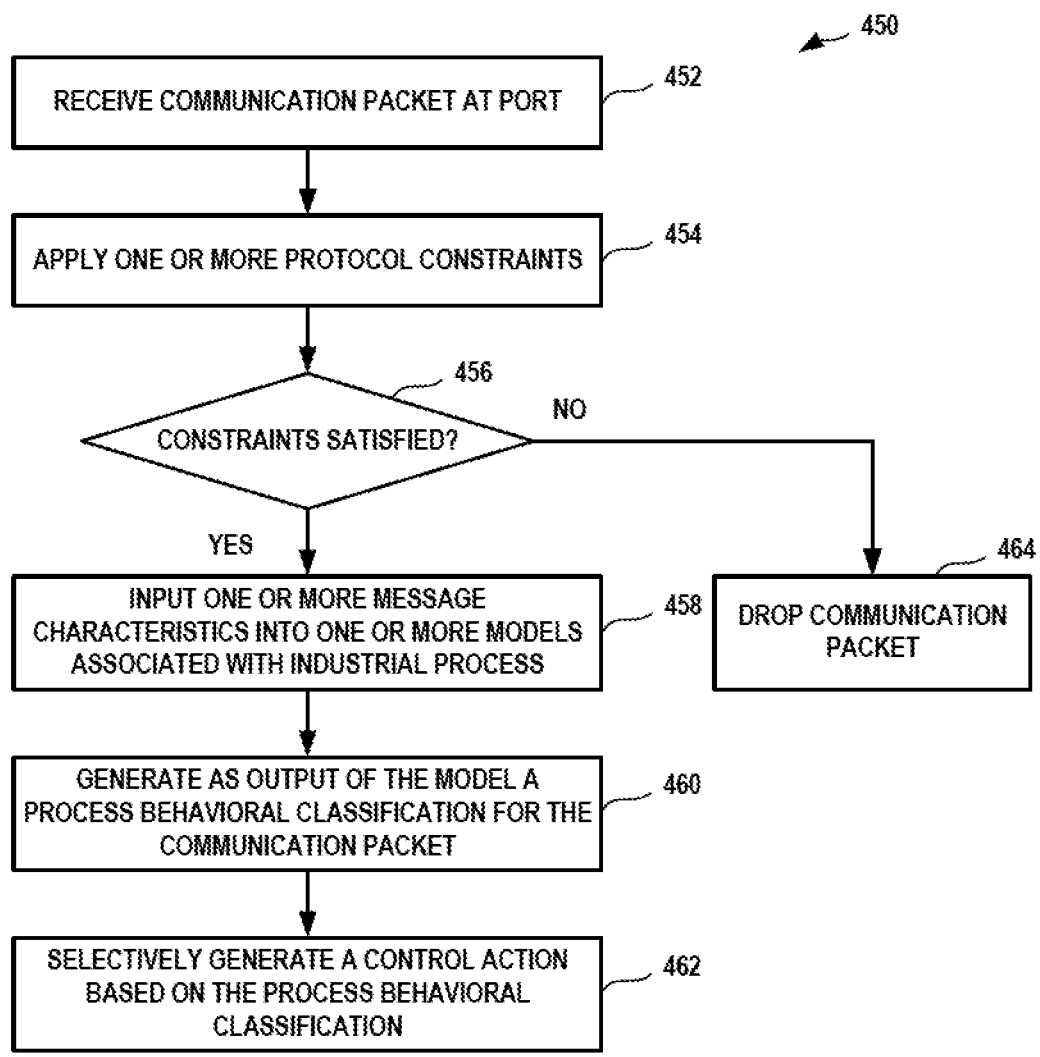
FIG. 6 is a flowchart describing a process of routing a communication packet by a network switch in accordance with example embodiments of the present disclosure.

FIG. 6 is a flowchart describing a process 450 for selectively generating a control action based on a process behavioral classification for communication packets in an industrial control system network in accordance with example embodiments of the disclosed technology. In example embodiments, process 450 may be performed by a network switch 350 including one or more computing devices implementing a protocol analyzer 362 and/or process analyzer 366 as described herein. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure. Additionally, while various steps may be described with relation to particularly disclosed components, the various steps are not so limited and may be performed by any suitable device or component disclosed herein.

At (452), a communication packet is received at one or more ports of a network switch. At (454), one more protocol constraints are applied to the communication packet. In some examples, the one or more protocol constraints may correspond to a particular type of communication packet, such as may be determined by header information included with the communication packet. In another example, the one or more protocol constraints may be applied irrespective of the type of communication packet.

At (456), it is determined whether the communication packet satisfies the one or more protocol constraints. If the communication packet fails to satisfy the one or more protocol constraints, the communication packet is dropped at (464). Block 464 may include any suitable technique for rejecting the communication packet. For example, the communication packet may be dropped by simply not forwarding the communication packet from the network switch.

At (458), one or more message characteristics from the communication packet are input into one or more models associated with the industrial process. In one embodiment, block 458 includes inputting the entire communication packet into one or more models. In some examples, the message characteristic includes a control parameter or sensor parameter included in a communication packet, such as in the payload. For example, a message a characteristic may be a sensor parameter from an electronic device such as a sensor identifying a measured parameter of the ICS. In another example, the message characteristic may be a control parameter, such as may be included in a command packet to control one or more electronic devices of the ICS. In yet another example, the message characteristic may be a characteristic associated with the communication packet, such as a frequency associated with receiving or transmitting a group of packets including the particular communication packet.

At (460), a process behavioral classification for the communication packet is generated as an output of the one or more models. The process behavioral classification may include characterization of the communication packet based on the one or more message characteristics associated with the communication packet and/or message characteristics associated with other communication packets.

By way of example, a particular type of security breach may include actuating the pump or valve at a particular frequency to cause a deleterious effect within the ICS. Accordingly, one or more models may generate a process behavioral classification based on particular communication packet as well as one or more additional communication packets associated with the particular communication packet. For example, a behavioral classification may be generated based on a plurality of message characteristics such as those associated with the sequence or other grouping of communication packets associated with particular electronic device, location etc. In this manner, one more models may detect malicious behavior that would otherwise seem benign. For example, a communication packet meeting all protocol constraints may appear to be a safe communication packet for processing within the ICS. However, providing the communication packet to a model that provides a classification based on predetermined message characteristics may identify that the communication packet when combined with other communication packets may cause an undesired outcome in the ICS.

At (462), a control action is selectively generated based on the process behavioral classification. Selectively generating the control action may include selectively transmitting the communication packet. For example, some communication packets may be transmitted based on a particular behavioral classification. Other communication packets however, may be dropped based on their behavioral classification. Additionally, a control action such as generating an alert or a command from one or more electronic devices within the ICS may be selectively generated based on the process behavioral classification.

Figure 7:
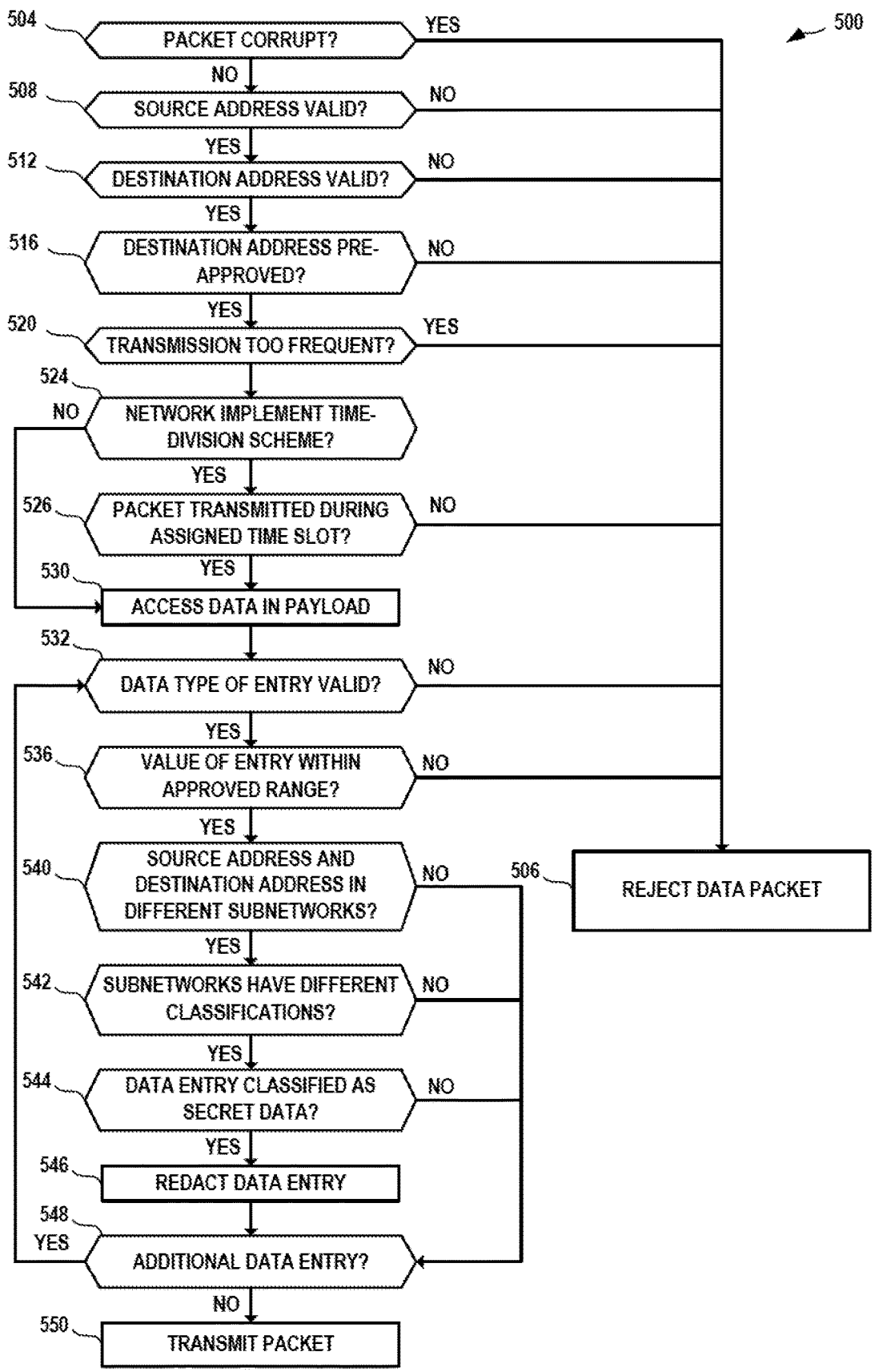
FIG. 7 is a flowchart describing a process of analyzing communication packets based on protocol constraints in accordance with example embodiments of the present disclosure.

FIG. 7 is a flowchart describing an example process 500 for auditing data communications on a deterministic network. Process 500 can be implemented using, for instance, network switch 350. Process 500 is one example of applying one or more protocol constraints and determining whether the protocol constraints are satisfied as can be performed at blocks 454 and 456 of process 450. In some implementations, process 500 may be performed by network switch 350 without using a process classification technique. For example, data packets may be selectively routed using the process of FIG. 7 without using one or more models.

A network switch can obtain a communication packet comprising at least a source address and a destination address. The communication packet may be received at one or more ports of the network switch, as described in FIG. 6. At (504), the network switch determines whether the communication packet is corrupted. Specifically, in example embodiments, the communication packet can include an error-detecting code that can be used to determine whether the communication packet is corrupted. It should be appreciated that the network switch 350 can be configured to implement any suitable error-detecting algorithm. For example, the network switch can implement a checksum algorithm. In this manner, the network switch can determine whether the communication packet is corrupted. If, upon implementing the error-detecting algorithm, the network switch determines that the communication packet is corrupted, the process 500 can proceed to (506) and reject (e.g., drop) the communication packet. If, however, the network switch determines that the communication packet is not corrupted, the process 500 can proceed to (508).

At (508), the network switch can determine whether the source address corresponds to an electronic device on the network. In example embodiments, determining whether the source address corresponds to an electronic device can include accessing a header of the communication packet. In addition, the source address can be compared against a unique identifier (e.g., network ID) assigned to each electronic device on the network. If the source address does not match one of the unique identifiers (e.g., a first electronic device), then the network switch can reject the communication packet at (506). Alternatively, if the source address matches one of the unique identifiers, such as the unique identifier assigned to a first electronic device, then the process 500 can proceed to (516).

At (512), the network switch determines whether the destination address corresponds to an electronic device (e.g., second electronic device) that is different than the first electronic device. In example embodiments, determining whether the destination address corresponds to the second electronic device can include accessing a header of the communication packet. The destination address can be compared against a unique identifier (e.g., network ID) assigned to each electronic device on the network, including. If the destination address does not match one of the unique identifiers, the network switch can reject the communication packet. In one example, the network switch can drop the communication packet at (506). Alternatively, if the destination address matches one of the unique identifiers, such as the unique identifier assigned to the second electronic device, then the process 500 can proceed to (516).

At (516), the network switch can compare an actual value of a destination address characteristic of the communication packet against a reference value for the characteristic. The reference value can be the unique identifier assigned to another electronic device on the network that is permitted to receive the communication packet from the first electronic device. The actual value can be the unique identifier (e.g., network ID) included in the destination address field of the communication packet. If the actual value does not match the reference value (e.g., approved destination addresses), then the network switch can reject the communication packet at (506). If, however, the actual value matches the reference value, then the process 500 can proceed to (520).

At (520), the process 500 can include comparing a frequency characteristic of the communication packet against a reference value for the frequency characteristic. In an example embodiment, the characteristic can be how frequently the first electronic device transmits data. More specifically, the actual value can be a time lapse between successive transmissions of the communication packet, and the reference value can be a threshold value indicating how frequently the first electronic device is allowed to transmit the communication packet. In example embodiments, the network switch can include a timer configured to monitor an amount of time lapsing between successive transmissions of the communication packet. If the actual value (e.g., a value measured by the timer) is equal to or below the reference value, then the network switch can determine the first electronic device is transmitting the communication packet too frequently and reject (e.g., drop) the communication packet at (506). If, however, the actual value is greater than the reference value, then the process 500 can proceed to (524).

At (524), the network switch determines whether the protocol for the deterministic network includes a time-division scheme. Specifically, in example embodiments, the time-division scheme can include a plurality of time slots, and each electronic device on the deterministic network can be assigned one time slot of the plurality of time slots. For example, the first electronic device can be assigned a first time slot, whereas the second electronic device can be assigned a second time slot. If the protocol for the deterministic network does include the time-division scheme, then the process 500 can proceed to (526). Otherwise, the process 500 can proceed to (530).

At (526), the network switch can determine whether the communication packet was transmitted during a time slot assigned to the electronic device whose unique identifier matches the source address. If the communication packet was transmitted outside the time slot, network switch rejects the communication packet at (506). Otherwise, the process 500 proceeds to (530).

At (530), the network switch accesses a payload of the communication packet. In example embodiments, the payload can include data that is to be transmitted to the second electronic device. After accessing the payload, the process 500 can proceed to (532).

At (532), the network switch compares an actual value for a data type (e.g., char, int, float, etc.) characteristic of the communication packet against a reference value. The actual value can be the data type of a data entry, and the reference value can be an allowed data type assigned to the data entry. As such, if the actual value for the data entry does not match the reference value for the data entry, then the network switch rejects (e.g, drops) the communication packet at (506). Otherwise, the process 500 can proceed to (536).

At (536), the network switch compares an actual value for a range characteristic of the communication packet against a reference value. In an example embodiment, the characteristic can be a range of approved values for the data entry. More specifically, the actual value can be a number or letter indicating the present value of the data entry, and the reference value can include the range of approved values. As such, if the actual value for the data entry does not match the reference value for the data entry, then the network switch rejects the communication packet at (506). Otherwise, the process 500 can proceed to (540).

At (540), the network switch determines whether the electronic device corresponding to the source and the electronic device corresponding to the destination address are in different subnetworks. If the electronic device corresponding to the source address is in a first subnetwork and the electronic device corresponding to the destination address is in a second subnetwork that is different than the first subnetwork, process 500 proceeds to (548). Otherwise, process 500 can proceed to (542).

At (542), the network switch determines whether a classification assigned to a first subnetwork that includes the electronic device corresponding to the source address is higher than a classification assigned to a second subnetwork that includes the electronic device corresponding to the destination address. For example, if the first subnetwork is rated for secret data and non-secret data and the second subnetwork is only rated for non-secret data, then the classification of the first subnetwork can be greater than the classification of the second subnetwork. When the classification of the first subnetwork is different (e.g., greater) than the classification of the second subnetwork, the process 500 can proceed to (544). Otherwise, the process 500 can proceed to (548).

At (544), the network switch determines whether the data entry included in the payload of the communication packet comprises secret data. If the data entry does include secret data, the process 500 can proceed to (546). Otherwise, the process 500 can proceed to (548).

At (546), the network switch redacts the data entry classified as secret data. In alternative embodiments, however, the network switch can obfuscate the data entry classified as secret data. More specifically, the network switch can introduce error to diminish the accuracy of the data entry classified as secret data. In this way, the network switch can maintain confidentiality of the first subnetwork relative to the second subnetwork. After redacting or obfuscating the portion of the data classified as secret data, the process 500 can proceed to (548).

At (548), the network switch checks whether the data includes additional entries. If the data does include additional data entries, then the process 500 reverts to (532). Otherwise, the process 500 can proceed to (544) where the network switch transmits the communication packet to the second electronic device. In example embodiments, the protocol for the deterministic network can include a list of approved messages (e.g., communication packets) that have been identified as bad messages (e.g., messages posing a security risk). As an example, an approved message (e.g., communication packet) can include data comprising a text string that satisfies the criteria (e.g, data type, range of allowable values) discussed above. However, the text string can contain a combination of numbers, letters, or both that can comprise operation of a device receiving the communication packet. As such, a communication packet having a text string that includes the combination can be classified as a bad message. In this way, the protocol can provide an additional safeguard beyond those discussed above.

Figure 8:
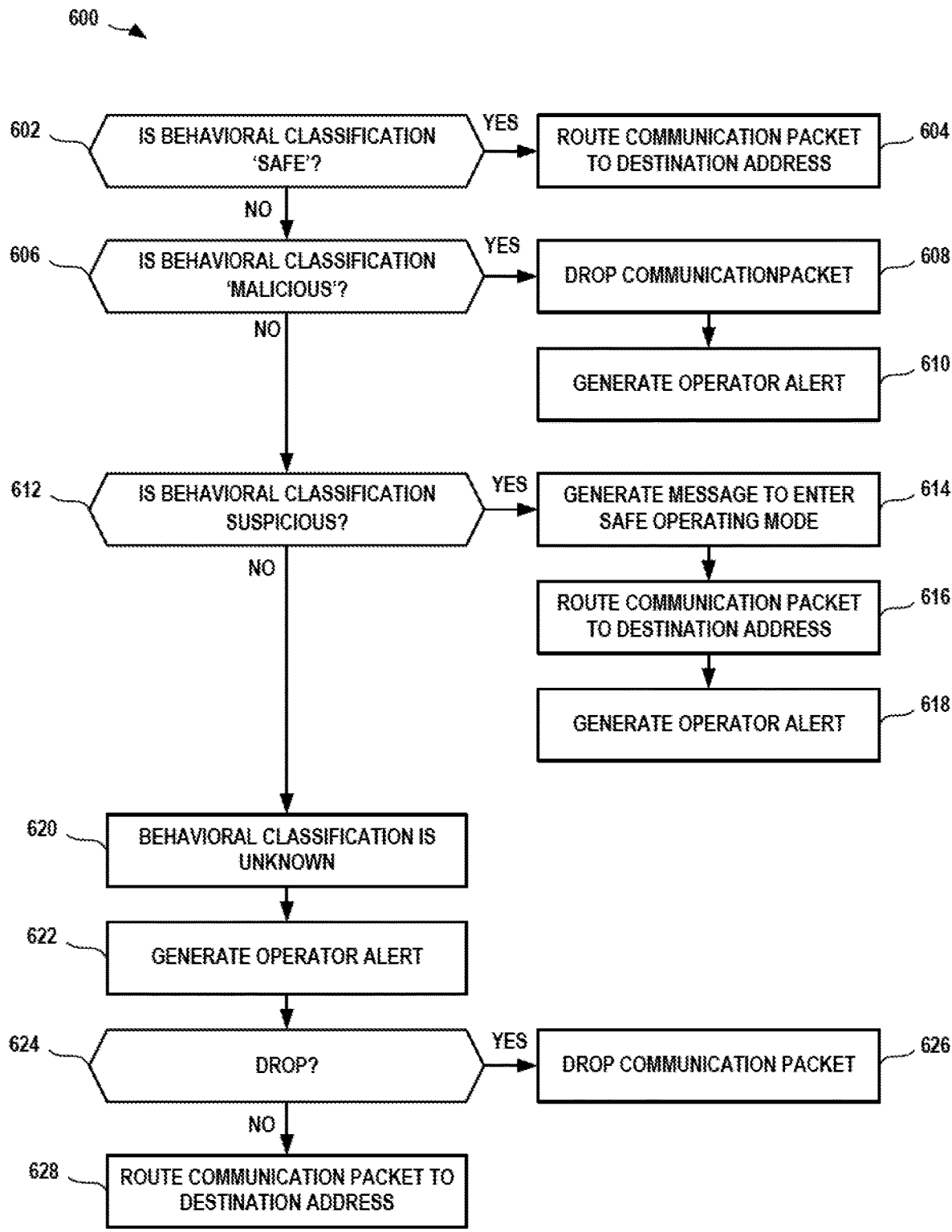
FIG. 8 is a flowchart describing a process of analyzing communication packets based on a process behavioral model in accordance with example embodiments of the present disclosure.

FIG. 8 is a flowchart describing a process 600 of selectively generating a control action in accordance with example embodiments of the disclosed technology. In one example, process 600 can be performed at block 462 of process 450. In some implementations, process 600 may be performed by one or more computing devices implementing a control action generator as described herein. In another example, process 600 may be performed by a process classifier and/or protocol analyzer.

At (602), a communication packet received at a network switch is analyzed to determine whether a behavioral classification for the communication packet is safe. If the behavioral classification is safe, the network switch can route the communication packet to the destination address associated with the communication packet at (604). Block 602 is one example of determining whether a behavioral classification satisfies one or more threshold criterion. In this example the one or more threshold criterion include a minimum classification level. More particularly, the minimum classification level is a safe classification level. If the behavioral classification meets the safe classification level, no control action is generated in this example.

At (606), it is determined whether the behavioral classification for the communication packet is malicious. Block 606 is an example of determining whether the behavioral classification meets an additional classification level. If the communication packet is classified as malicious, the network switch drops the communication packet at (608). Additionally, the network switch may generate an operator alert at (610). Block 610 is optional. The operator alert may be a control signal for a display or other user interface, providing an audible or visual alert for an operator indicating that the communication packet was deemed malicious and not routed through the switch. In another example, an operator alert can be a flag or other indication that can be stored to indicate that a packet was dropped. In some examples, the malicious communication packet is dropped without generating an operator alert.

If the communication packet is not classified as safe or malicious, the network switch determines whether the communication packet has been classified as suspicious at (612). If the communication packet is classified as suspicious (e.g., a third classification level), the control action is generated at (614). In the particular example of FIG. 8, the network switch generates a control action including a control packet including a control parameter instructing one or more electronic devices to enter a safe operating mode. At (616), the network switch routes the communication packet to the destination address included in the header of the communication packet. At (618), the network switch optionally generates an operator alert as described with respect to (610).

If the communication packet is not classified as malicious, suspicious, or safe, the network switch determines that the communication packet has an unknown behavioral classification at (620). At (622), the network switch generates an operator alert. In this example, the operator alert includes a notification to an operator to choose whether to route or drop the communication packet. For example, the network switch made generate control signal providing a user interface configured to receive a selection from an operator. If the network switch receives an indication that the packet should be dropped, the communication packet is dropped at (626). If, however, the network switch receives an indication that the communication packet should be routed, the network switch routes the communication packet to the destination address at (628).

Figure 9:
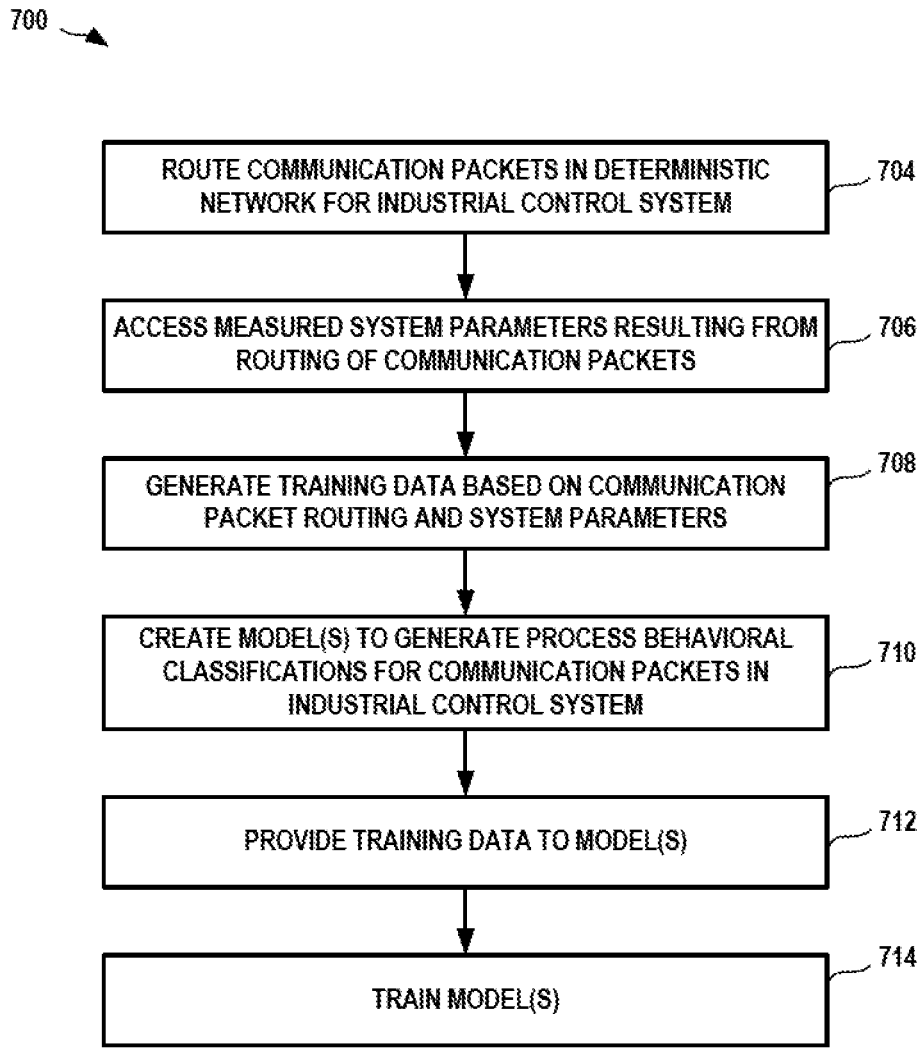
FIG. 9 is a flowchart describing a process of training a model to generate process behavioral classifications based on routing communication packets in accordance with example embodiments of the present disclosure.

FIG. 9 is a flowchart describing a process 700 of creating a model to generate process behavioral classifications based on message parameters associated with communication packets in an industrial control system. FIG. 9 describes an example with respect to creating and training a machine learned model. In other examples, a physics-based model or other type of model may be created in order to generate behavioral classifications for communication packets.

At (704), a network switch routes communication packets in a deterministic network for industrial control system. The communication packets include communication packets and/or control packets associated with electronic devices in the ICS.

At (706), sensor parameters resulting from routing the communication packets are accessed. The ICS includes one or more sensors that generate measured system parameters associated with the ICS. The sensors transmit communication packets including the measured system parameters At (708), training data is generated based on the routed communication packets and the resulting sensor parameters. The training data may include a classification for different types of communication packets. The training data may include a classification for different content of communication packets, including the content for different fields and/or the presence or absence of different fields. Numerous types and variations classifications may be used. For example, process behavioral classifications may be used to characterize a result of the communication packet on the overall industrial control system. For example the training data may include classification for communication packets including the process behavioral classification indicating a likely or predicted result of the communication packet.

At (710), one or more models are created that are configured to generate process behavioral classification for communication packets in an industrial control system. In one embodiment, the model is generated for specific industrial process or industrial process type. The model may be configured to generate a process behavioral classification in response to an input including one or more message characteristics or communication packets in their entirety.

At (712), the training data from block 708 is provided to the one or more models created at block 710. At (714), the one or more models are trained using the raining data. In various examples, an initial model may be created at block 710 and the training data used to train the model. In this manner, the model may be created to generate classifications based on observed outcomes of particular communication packets in the training data.

According to some aspects of the disclosed technology, an industrial control system is provided with different safety integrity levels and segregation of communications using the different safety integrity levels. Communications in different safety integrity levels can be communicated over one common line, but can be segregated such that they do not interfere with each other.

FIG. 10 is a block diagram depicting an industrial control system 800 in accordance with example embodiments of the disclosed technology. Industrial control system 800 includes a network switch 850 in communication with an industrial controller 820, a first sensor 802, a second sensor 804, a third sensor 86, and an actuator 808. The particular components depicted in FIG. 10 are provided by way of example only as an ICS may include any number and type of electric/electronic component.

Industrial controller 820 performs safety functions and optionally management functions. Network switch 850 is configured to perform segregation of safety functions and management functions, while industrial controller 820 is configured to perform both safety and management functions. In this particular example, first sensor 802 implements no safety functions. Accordingly, first sensor 802 is depicted as communicating with no safety integrity level (SIL). The second sensor 804 is configured to communicate at a second safety integrity level SIL2. The third sensor 806 is configured to communicate at a third safety integrity level SIL3. The actuator 808 is also configured to communicate at the third safety integrity level SIL3.

Network switch 850 is configured to manage communications at all safety integrity levels in order to simplify network 850. Network switch 850 is configured so that lower integrity signals will not interfere with higher integrity signals. Some signals/messages may not have any safety integrity, as they may not be safety relevant. On the other hand, other signals/messages may have various safety integrity levels set according to the importance of the safety function. For example, four safety integrity levels SIL0, SIL1, SIL2, and an SIL3 may be used as shown in FIG. 10, with SIL0 corresponding to no safety/integrity and SIL1, SIL2, and SIL3 corresponding to increased levels of safety/integrity. Any number of safety integrity levels may be used in accordance with various embodiments. Examples of non-safety related functions include management functions. In a power plant example, the number of operating hours as measured by an elapsed time indicator may be a non-safety related function. A safety related function example can be an over-speed sensor that is used to shut down an engine before a catastrophic failure. In traditional architectures, these different types of signals would be sent over separate cabling so that an ETI sensor for example could not suppress the over-speed, such as by being a babbling node.

Network switch 850 can force segregation and allow relevant prioritization of the higher safety integrity levels from/over the lower safety integrity levels. In this manner, an overlap of security and safety can be provided. Moreover, this architecture provides a significant reduction of cabling and simplification as less redundancy or duplication is needed at the network level. Instead, network resources can be shared in both a safe and secure manner.

Figure 11:
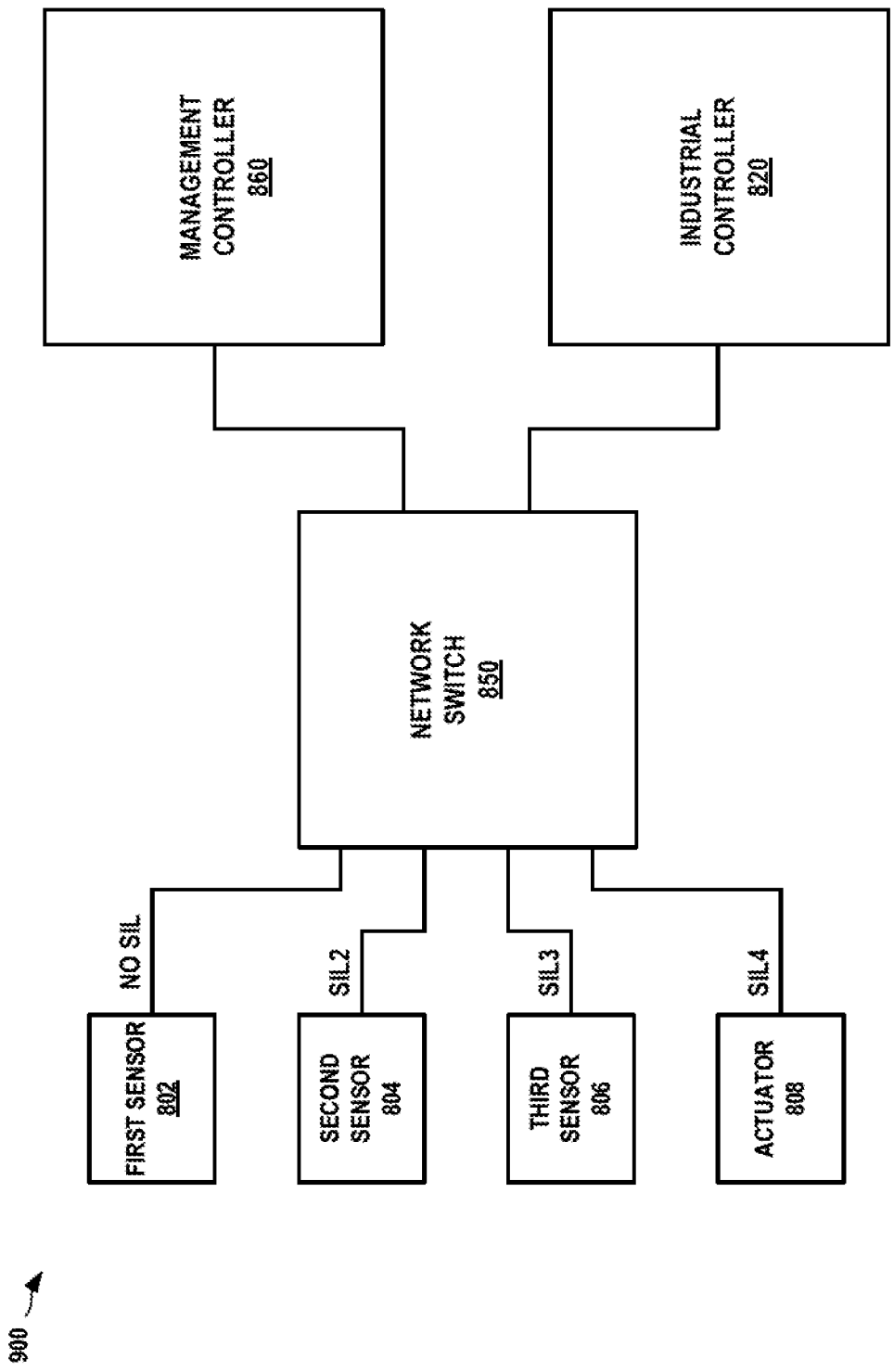
FIG. 11 depicts a block diagram of an example industrial control system in accordance with example embodiments of the present disclosure.
Figure 12:
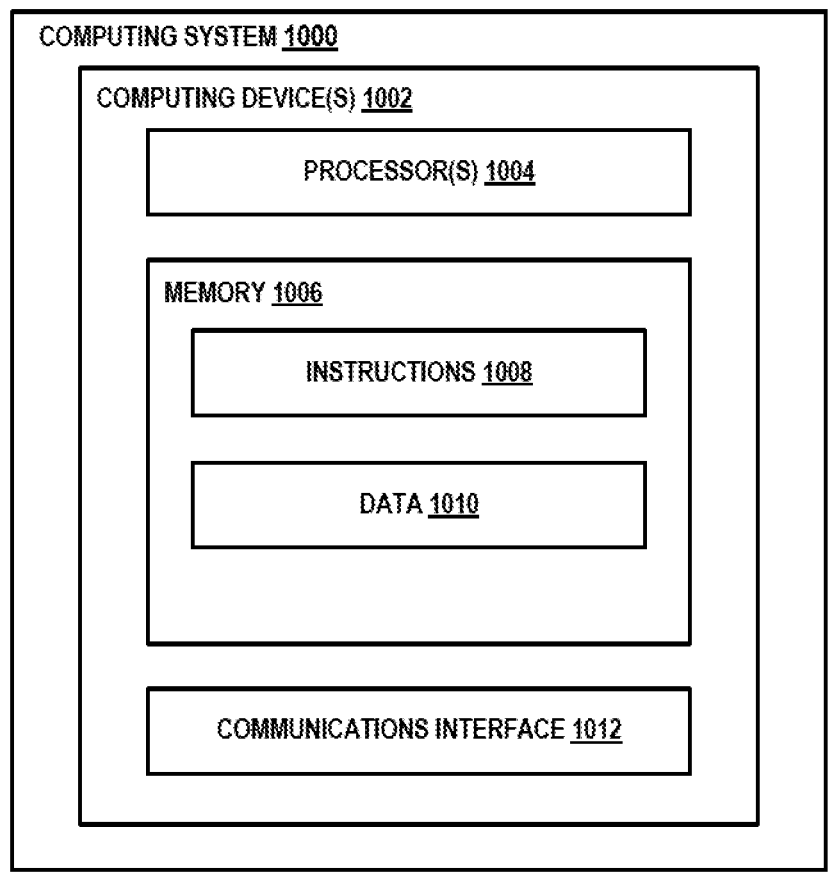
FIG. 12 depicts a block diagram of an example of a computing system.

FIG. 11 is a block diagram of an example industrial control system 900 in accordance with example embodiments of the disclosed technology. ICS 900 includes network switch 850, industrial controller 820, first sensor 802, second sensor 804, third sensor 806, and actuator 808. In the example of FIG. 11, the sensors and actuators operate at the four different safety integrity levels as described with respect to FIG. 10. In this example, however, an additional management controller 860 is provided. In this example, industrial controller 820 may be concerned solely with safety and some basic control functions. Management controller 860 can be provided for non-safety related functionality.

The examples described in FIG. 10 and FIG. 11 can be contrasted with a traditional network. In a traditional network, each component of the network operating at the same safety integrity level may be coupled to the same network switch, with each network switch only communicating according to a single safety integrity level. With respect to FIG. 10 for example, a first network switch may communicate with the first sensor 802 using no SIL, a second network switch may communicate with the second sensor 804 using SIL1, and a third network switch 806 may communicate with the third sensor 806 and the actuator 808 using SIL3.

FIG. 10 depicts a block diagram of an example computing system 1000 that can be used to implement methods and systems according to example embodiments of the present disclosure. Computing system 1000 may be used to implement a network switch 350, controller 20, 120, 220, or other electronic devices 30, etc. as described herein. It will be appreciated, however, that computing system 1000 is one example of a suitable computing system for implementing the network switch 350 and other computing elements described herein.

As shown, the computing system 1000 can include one or more computing device(s) 1002. The one or more computing device(s) 1002 can include one or more processor(s) 1004 and one or more memory device(s) 1006. The one or more processor(s) 1004 can include any suitable processing device, such as a microprocessor, microcontroller, integrated circuit, logic device, or other suitable processing device. The one or more memory device(s) 1006 can include one or more computer-readable media, including, but not limited to, non-transitory computer-readable media, RAM, ROM, hard drives, flash drives, or other memory devices.

The one or more memory device(s) 1006 can store information accessible by the one or more processor(s) 1004, including computer-readable instructions 1008 that can be executed by the one or more processor(s) 1004. The instructions 1008 can be any set of instructions that when executed by the one or more processor(s) 1004, cause the one or more processor(s) 1004 to perform operations. The instructions 1008 can be software written in any suitable programming language or can be implemented in hardware. In some embodiments, the instructions 1008 can be executed by the one or more processor(s) 1004 to cause the one or more processor(s) 1004 to perform operations, such as the operations for comparing communication packets to protocol constraints and/or processing communication packets according to process behavioral models, including the selected generation of control actions including the selected transmission of communication packets as described above, and/or any other operations or functions of the one or more computing device(s) 1002.

The memory device(s) 1006 can further store data 1010 that can be accessed by the processors 1004. For example, the data 1010 can include sensor parameters, control parameters, protocol constraints, process behavioral models, etc., as described herein. The data 1010 can include one or more table(s), function(s), algorithm(s), model(s), equation(s), etc. according to example embodiments of the present disclosure.

The one or more computing device(s) 1002 can also include a communication interface 1012 used to communicate, for example, with the other components of system. The communication interface 1012 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An industrial control system (ICS), comprising:
   a communication network;
   a first electric device coupled to the communication network;
   a second electric device coupled to the communication network;

a network switch having a first port coupled to the first electric device over the communication network and a second port coupled to the second electric device over the communication network, the network switch configured to:
receive via the first port a data packet having a source address and a destination address;
determine whether the source address corresponds to the first electric device and whether the destination address corresponds to the second electric device;
in response to determining that the source address and destination address correspond to the first electric device and the second electric device, respectively, compare an actual value of a characteristic of the data packet with a reference value for the characteristic; and
transmit via the second port the data packet to the destination address if the actual value corresponds to the reference value;
wherein the network switch is further configured to input at least a portion of the data packet into one or more physics-based or machine-learned models associated with one or more industrial processes, the one or more physics-based or machine-learned models configured to output a process behavioral classification based at least in part on the at least a portion of the data packet, wherein the process behavioral classification is indicative of a potential effect associated with the one or more industrial processes based at least in part on transmitting the data packet to the second electric device, wherein the one or more physics-based or machine-learned model is generated by inputting a plurality of message characteristics from a first sequence of communication packets corresponding to one or more industrial processes and observing an outcome or result of the one or more industrial processes.

2. The ICS of claim 1, wherein:
the characteristic comprises the destination address of the data packet;
the reference value comprises one or more destination addresses approved to receive the data packet;
the network switch is configured to drop the data packet if the actual value does not match the one or more destination addresses approved to receive the data packet.

3. The ICS of claim 1, wherein:
the data packet includes a header and a payload;
the header includes the source address and the destination address;
the payload includes data comprising one or more entries;
the characteristic comprises the payload of the data packet;
the network switch configured to drop the data packet if the actual value does not correspond to an approved range of values for the data of the payload.

4. The ICS of claim 1, wherein the characteristic comprises a frequency of transmission associated with the data packet;
the reference value includes a threshold defining a maximum frequency for data packet transmissions from the first electric device.

5. The ICS of claim 1, wherein the first electric device and the second electric device are on different subnetworks of a deterministic network.

6. The ICS of claim 5, wherein the first electric device is on a first subnetwork of the deterministic network that is rated for data classified as both secret and non-secret, and wherein the second electric device is on a second subnetwork of the deterministic network that is rated for data classified only as non-secret.

7. The ICS of claim 1, wherein the network switch is configured to obfuscate at least a portion of the data packet prior to transmitting the data packet via the second port to the destination address.

8. The ICS of claim 1, wherein the network switch is configured to restrict the data packet such that only a portion of the entire data packet is transmitted via the second port to the destination address.

9. A network switch for an automated control system, the network switch comprising:
a first port configured for communication with a first electric device in a deterministic network;
a second port configured for communication with a second electric device in the deterministic network;
one or more processors in communication with the first port and the second port, the one or more processors configured to perform operations, the operations comprising:
receiving at the first port a communication packet associated with the first electric device and the second electric device;
determining if the communication packet satisfies a plurality of protocol constraints;
in response to the communication packet satisfying the plurality of protocol constraints, inputting one or more message characteristics from the communication packet into one or more physics-based or machine-learned models associated with one or more automated processes, the one or more physics-based or machine-learned models configured to output a process behavioral classification based at least in part on the one or more message characteristics, wherein the one or more physics-based or machine-learned models is generated by inputting a plurality of message characteristics from a first sequence of communication packets corresponding to one or more automated processes and observing an outcome or result of the one or more automated processes;
receiving, as output of the one or more physics-based or machine-learned models in response to the one or more message characteristics, a process behavioral classification for the communication packet, the process behavioral classification indicative of a potential effect associated with the one or more automated processes based at least in part on transmitting the communication packet to the second electric device; and
selectively generating a control action for the automated control system based at least in part on the process behavioral classification.

10. The network switch of claim 9, wherein selectively generating a control action comprises:
selectively transmitting the communication packet to the second electric device based at least in part on the process behavioral classification.

11. The network switch of claim 10, wherein selectively transmitting the communication packet comprises:
transmitting the communication packet to the second electric device if the process behavioral classification satisfies one or more threshold criterion; and
dropping the communication packet if the process behavioral classification fails to meet the one or more threshold criterion.

12. The network switch of claim 9, wherein selectively generating a control action comprises, in response to the process behavioral classification failing to meet one or more threshold criterion:
- transmitting the communication packet to the second electric device; and
- generating an alert indicating that the communication packet failed to meet a minimum classification level.

13. The network switch of claim 9, wherein selectively generating a control action comprises:
- in response to the process behavioral classification failing to meet one or more threshold criterion, transmitting one or more signals to the first electric device and the second electric device including a command to operate in a safe-operating mode.

14. The network switch of claim 9, wherein the communication packet is a first communication packet, the operations further comprising:
- inputting a plurality of message parameters from a sequence of communication packets including the first communication packet into the one or more physics-based or machine-learned models,
- wherein receiving the process behavioral classification comprises receiving a process behavioral classification for each communication packet of the sequence based on the sequence of communication packets.

15. The network switch of claim 9, the operations further comprising:
- determining, based on the one or more physics-based or machine-learned models, whether the sequence of communication packets is indicative of an unknown automated control system behavior or a predetermined malicious behavior associated with the automated control system.

16. A computer-implemented method, comprising:
- receiving, at a first port of a network switch, a communication packet, intended for a second electric device, from a first electric device of an automated control system comprising a deterministic network;
- determining, by the network switch, whether the communication packet satisfies a plurality of protocol constraints associated with the deterministic network;
- in response to the communication packet satisfying the plurality of protocol constraints, determining a process behavioral classification for the communication packet based at least in part on one or more message characteristics of the communication packet and a physics-based or machine-learned model associated with a first automated process, the process behavioral classification indicative of a potential effect associated with the first automated process based at least in part on transmitting the communication packet to the second electric device, the physics-based or machine-learned model generated by inputting a plurality of message characteristics from a first sequence of communication packets corresponding to one or more automated processes and observing an outcome or result of the one or more automated processes; and
- selectively generating, by the network switch, a control action for the automated control system based on the process behavioral classification.

17. The computer-implemented method of claim 16, wherein selectively generating a control action comprises:
- transmitting the communication packet to the second electric device in response to a first process behavioral classification that meets a minimum classification level; and
- dropping the communication packet in response to a second process behavioral classification that fails to meet the minimum classification level.

18. The computer-implemented method of claim 16, wherein selectively generating a control action comprises:
- in response to the process behavioral classification failing to meet a minimum classification level, transmitting one or more signals to the first electric device and the second electric device including a command packet to operate in a safe-operating mode.

19. The computer-implemented method of claim 16, wherein selectively generating the control action comprises:
- in response to the process behavioral classification failing to meet a minimum classification level, transmitting the communication packet to the second electric device specified by the communication packet; and
- in response to the process behavioral classification failing to meet the minimum classification level, generating the control action.

* * * * *